US012444305B2

(12) United States Patent
Agrawal et al.

(10) Patent No.: US 12,444,305 B2
(45) Date of Patent: Oct. 14, 2025

(54) COMBINATION ALERTS

(71) Applicant: NETRADYNE, INC., San Diego, CA (US)

(72) Inventors: Avneesh Agrawal, Bengaluru (IN); Venkata Sreekanta Reddy Annapureddy, San Diego, CA (US); David Jonathan Julian, San Diego, CA (US); Arvind Yedla, La Jolla, CA (US); Vinay Kumar Rai, Bengaluru (IN); Michael Campos, La Jolla, CA (US)

(73) Assignee: NETRADYNE, INC., San Diego, CA (US)

(*) Notice: Subject to any disclaimer, the term of this patent is extended or adjusted under 35 U.S.C. 154(b) by 213 days.

(21) Appl. No.: 17/796,287

(22) PCT Filed: Jan. 29, 2021

(86) PCT No.: PCT/US2021/015909
§ 371 (c)(1),
(2) Date: Jul. 29, 2022

(87) PCT Pub. No.: WO2021/155294
PCT Pub. Date: Aug. 5, 2021

(65) Prior Publication Data

US 2023/0061784 A1 Mar. 2, 2023

Related U.S. Application Data

(60) Provisional application No. 63/041,761, filed on Jun. 19, 2020, provisional application No. 62/967,574, filed on Jan. 29, 2020.

(51) Int. Cl.

| | |
|---|---|
| ***G08G 1/16*** | (2006.01) |
| ***G08G 1/01*** | (2006.01) |
| ***G08G 1/0967*** | (2006.01) |

(52) U.S. Cl.
CPC ........... *G08G 1/166* (2013.01); *G08G 1/0112* (2013.01); *G08G 1/0133* (2013.01); *G08G 1/096775* (2013.01); *G08G 1/096791* (2013.01)

(58) Field of Classification Search
CPC .... G08G 1/166; G08G 1/0112; G08G 1/0133; G08G 1/096775; G08G 1/096791;
(Continued)

(56) References Cited

U.S. PATENT DOCUMENTS 9,535,878 B1 1/2017 Brinkmann et al.
2007/0257781 A1* 11/2007 Denson ................. G07C 5/008 340/425.5

(Continued)

FOREIGN PATENT DOCUMENTS

EP 2314207 A1 4/2011
GB 2573738 A 11/2019

OTHER PUBLICATIONS

International Preliminary Report on Patentability on PCT/US2021/015909 dated Aug. 11, 2022 (8 pages).

(Continued)

*Primary Examiner* — Rufus C Point
(74) *Attorney, Agent, or Firm* — FOLEY & LARDNER LLP

(57) ABSTRACT

Systems and methods are provided for intelligent driving monitoring systems, advanced driver assistance systems and autonomous driving systems, and providing alerts to the driver of a vehicle. Combinations of co-occurring driving events may be detected and used to warn on anomalies, prevent accidents, provide feedback to the driver, and in general provide a safer driver experience.

27 Claims, 14 Drawing Sheets

(58) Field of Classification Search
CPC .......... G08G 1/0141; G08G 1/04; G08G 1/20; G06V 10/82; G06V 20/56; G06V 40/20; G06V 20/597; G07C 5/008; G07C 5/0866
See application file for complete search history.

(56) References Cited

U.S. PATENT DOCUMENTS

| | | | | |
|---|---|---|---|---|
| 2014/0125474 | A1 | 5/2014 | Gunaratne | |
| 2015/0112731 | A1* | 4/2015 | Binion | G06Q 40/08 705/4 |
| 2016/0101729 | A1* | 4/2016 | Burke | B60W 50/14 701/36 |
| 2016/0137142 | A1* | 5/2016 | Nemat-Nasser | B60R 11/04 386/227 |
| 2016/0267335 | A1 | 9/2016 | Hampiholi | |
| 2016/0335814 | A1* | 11/2016 | Tamari | G08G 1/0141 |
| 2017/0053555 | A1 | 2/2017 | Angel et al. | |
| 2018/0126901 | A1* | 5/2018 | Levkova | B60W 40/09 |
| 2018/0334176 | A1* | 11/2018 | Park | B60W 40/09 |
| 2019/0168771 | A1 | 6/2019 | Migneco et al. | |
| 2020/0183394 | A1* | 6/2020 | Lockwood | G06N 7/00 |

OTHER PUBLICATIONS

International Search Report and Written Opinion in International Patent Application No. PCT/US2021/15909 dated Apr. 14, 2021 (8 pages).

Extended European Search Report in EP Patent Application No. 21747910.4 dated Jun. 15, 2023, 8 pages.

* cited by examiner

COMBINATION ALERTS

CROSS-REFERENCE TO RELATED APPLICATION

The present application is a U.S. National Phase Application under 35 U.S.C. § 371 of International Patent Application No. PCT/US21/15909, filed on of Jan. 29, 2021, which claims the benefit of U.S. Provisional Patent Application No. 63/041,761 filed on of Jun. 19, 2020, and titled, "COMBINATION ALERTS," and U.S. Provisional Patent Application No. 62/967,574, filed on of Jan. 29, 2020, and titled, "MAP-BASED TRIGGER OF AN ANALYTICS ROUTINE,", the disclosures of which are each expressly incorporated by reference in its their entirety entireties.

BACKGROUND

Field

Certain aspects of the present disclosure generally relate to intelligent driving monitoring systems (IDMS), driver monitoring systems, advanced driver assistance systems (ADAS), and autonomous driving systems, and more particularly to systems and methods for determining, transmitting, and/or providing reports of driving events to an operator of a vehicle and/or a remote device of a driver monitoring system.

Background

Vehicles, such as automobiles, trucks, tractors, motorcycles, bicycles, airplanes, drones, ships, boats, submarines, and others, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn, lead to an increase in insurance rates for operating a vehicle. Inefficient driving, which may include hard accelerations, may increase the costs associated with operating a vehicle.

The types of monitoring available today, may be based on sensors and/or processing systems that do not provide context to a detected traffic event. For example, an accelerometer may be used to detect a sudden deceleration associated with a hard-stopping event, but the accelerometer may not be aware of the cause of the hard-stopping event. Accordingly, certain aspects of the present disclosure are directed to systems and methods of driver monitoring, driver assistance, and autonomous driving that may incorporate context so that such systems may be more effective and useful.

SUMMARY

Certain aspects of the present disclosure generally relate to providing, implementing, and using a computer-implemented method. The computer-implemented method generally includes detecting, by a computer in a vehicle, a combination driving event. Detecting the combination driving event generally includes detecting, by the computer, that a first driving event occurred at a first time, and detecting, by the computer, that a second driving event occurred at a second time and within a predetermined time interval of the first time. The first driving event and the second driving event belong to different classes of driving events. The method further includes modifying, by the computer and in response to the detection of the combination driving event, a parameter affecting a report to a remote device, in which the report includes an indication that the second driving event was detected at the second time.

Certain aspects of the present disclosure provide a system. The system generally includes a memory unit and a processor coupled to the memory unit, in which the processor is generally configured to detect that a first driving event occurred at a first time and detect that a second driving event occurred at a second time. The first driving event and the second driving event belong to different classes of driving events. The processor is further configured to detect a combination driving event, based on a determination that the second driving event occurred within a predetermined time interval of the first time. In response to the detection of the combination driving event, the processor is further configured to modify a parameter affecting a report to a remote device, in which the report includes an indication that the second driving event was detected at the second time.

Certain aspects of the present disclosure provide a computer program. The computer program product generally includes a non-transitory computer-readable medium having program code recorded thereon, the program code, when executed by a processor, causes the processor to detect that a first driving event occurred at a first time and detect that a second driving event occurred at a second time. The first driving event and the second driving event belong to different classes of driving events. The program code, when executed by the processor, further causes to processor to detect a combination driving event, based on a determination that the second driving event occurred within a predetermined time interval of the first time. In response to the detection of the combination driving event, the program code, when executed by the processor, further causes to processor to modify a parameter affecting a report to a remote device, in which the report includes an indication that the second driving event was detected at the second time.

Certain aspects of the present disclosure generally relate to providing, implementing, and using a method of determining an occurrence of a combination of events. The method generally includes determining an occurrence of a first traffic event at a first time; determining an occurrence of a second traffic event at a second time or an environmental context at a second time; and generating an alert in response to the first traffic event and the second traffic event if the first time and the second time is below a predetermined interval.

Certain aspects of the present disclosure provide an apparatus. The apparatus generally includes a memory unit; at least one processor coupled to the memory unit, in which the at least one processor is generally configured to: determine an occurrence of a first traffic event at a first time; determine an occurrence of a second traffic event at a second time or an environmental context at a second time; and generate an alert in response to the first traffic event and the second traffic event if the first time and the second time is below a predetermined interval.

Certain aspects of the present disclosure provide a computer program. The computer program product generally includes a non-transitory computer-readable medium having program code recorded thereon, the program code comprising program code that is generally configured to: determine an occurrence of a first traffic event at a first time; determine an occurrence of a second traffic event at a second time or an environmental context at a second time; and generate an alert in response to the first traffic event and the second traffic event if the first time and the second time is below a predetermined interval.

DETAILED DESCRIPTION

Figure 1A:
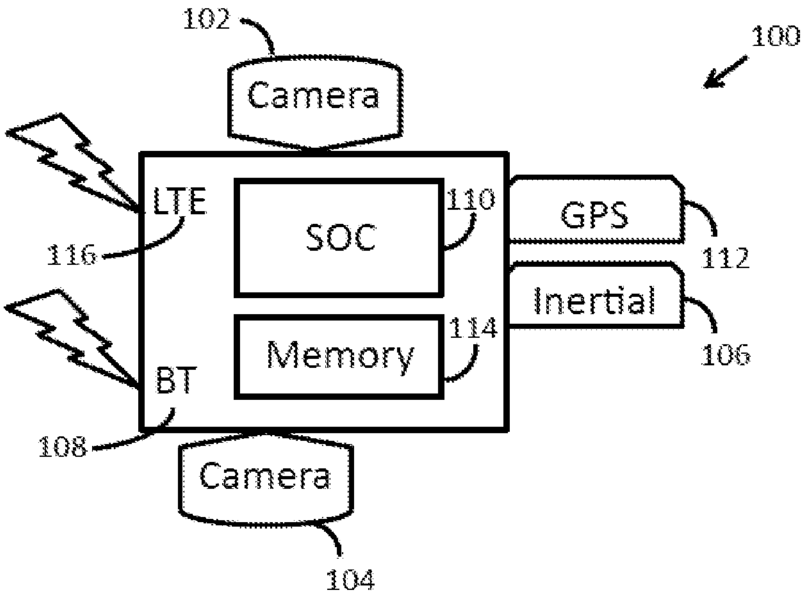
FIG. 1A illustrates a block diagram of an example system for determining, transmitting, and/or providing alerts to an operator of a vehicle and/or a remote driver monitoring system in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

Monitoring and Characterization of Driver Behavior

Driving behavior may be monitored. Driver monitoring may be performed in real-time or substantially real-time as a driver operates a vehicle, or may be done at a later time based on recorded data. Driver monitoring at a later time may be useful, for example, when investigating the cause of an accident, or to provide coaching to a driver. Driver monitoring in real-time may be useful to guard against unsafe driving, for example, by ensuring that a car cannot exceed a certain pre-determined speed.

Aspects of the present disclosure are directed to methods of monitoring and characterizing driver behavior, which may include methods of determining and/or providing alerts to an operator of a vehicle and/or transmitting remote alerts to a remote driver monitoring system. Remote alerts may be transmitted wirelessly over a wireless network to one or more servers and/or one or more other electronic devices, such as a mobile phone, tablet, laptop, desktop, etc., such that information about a driver and objects and environments that a driver and vehicle encounters may be documented and reported to other individuals (e.g., a fleet manager, insurance company, etc.). An accurate characterization of driver behavior has multiple applications. Insurance companies may use accurately characterized driver behavior to influence premiums. Insurance companies may, for example, reward risk mitigating behavior and dis-incentivize behavior associated with increased accident risk. Fleet owners may use accurately characterized driver behavior to incentivize their drivers. Likewise, taxi aggregators may incentivize taxi driver behavior. Taxi or ride-sharing aggregator customers may also use past characterizations of driver behavior to filter and select drivers based on driver behavior criteria. For example, to ensure safety, drivers of children or other vulnerable populations may be screened based on driving behavior exhibited in the past. Parents may wish to monitor the driving patterns of their kids and may further utilize methods of monitoring and characterizing driver behavior to incentivize safe driving behavior. Package delivery providers wishing to reduce the risk of unexpected delays, may seek to incentivize delivery drivers having a record of safe driving, that exhibit behaviors that correlate with successful avoidance of accidents, and the like.

In addition to human drivers, machine controllers are increasingly being used to drive vehicles. Self-driving cars, for example, may include a machine controller that interprets sensory inputs and issues control signals to the car so that the car may be driven without a human driver. As with human drivers, machine controllers may also exhibit unsafe or inefficient driving behaviors. Information relating to the driving behavior of a self-driving car would be of interest to engineers attempting to perfect the self-driving car's controller, to lawmakers considering policies relating to self-driving cars, and to other interested parties.

Visual information may improve existing ways or enable new ways of monitoring and characterizing driver behavior. For example, according to aspects of the present disclosure, the visual environment around a driver may inform a characterization of driver behavior. Typically, running a red light may be considered an unsafe driving behavior. In some contexts, however, such as when a traffic guard is standing at an intersection and using hand gestures to instruct a driver to move through a red light, driving through a red light would be considered an appropriate driving behavior. Visual information may also improve the quality of a characterization that may be based on other forms of sensor data, such as determining a safe driving speed. The costs of accurately characterizing driver behavior using computer vision methods in accordance with certain aspects of the present disclosure may be less than the costs of alternative methods that depend on human inspection of visual data. Camera based methods may have lower hardware costs compared with methods that involve RADAR or LiDAR. Still, methods that use RADAR or LiDAR are also contemplated for determination of cause of traffic events, either alone or in combination with a vision sensor, in accordance with certain aspects of the present disclosure.

FIG. 1A illustrates an embodiment of the aforementioned system for determining and/or providing alerts to an operator of a vehicle. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for determining, transmitting, and/or providing alerts to an operator of a vehicle and/or a device of a remote driver monitoring system may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112 or integrated within a System-on-a-chip 110. The device may further include memory storage 114.

A system for determining, transmitting, and/or providing alerts to an operator of a vehicle and/or a device of a remote driver monitoring system, in accordance with certain aspects of the present disclosure, may assess the driver's behavior in real-time. For example, an in-car monitoring system, such as the device 100 illustrated in FIG. 1A that may be mounted to a car, may perform analysis in support of a driver behavior assessment in real-time, and may determine a cause or potential causes of traffic events as they occur. In this example, the system, in comparison with a system that does not include real-time processing, may avoid storing large amounts of sensor data since it may instead store a processed and reduced set of the data. Similarly, or in addition, the system may incur fewer costs associated with wirelessly transmitting data to a remote server. Such a system may also encounter fewer wireless coverage issues.

Figure 1B:
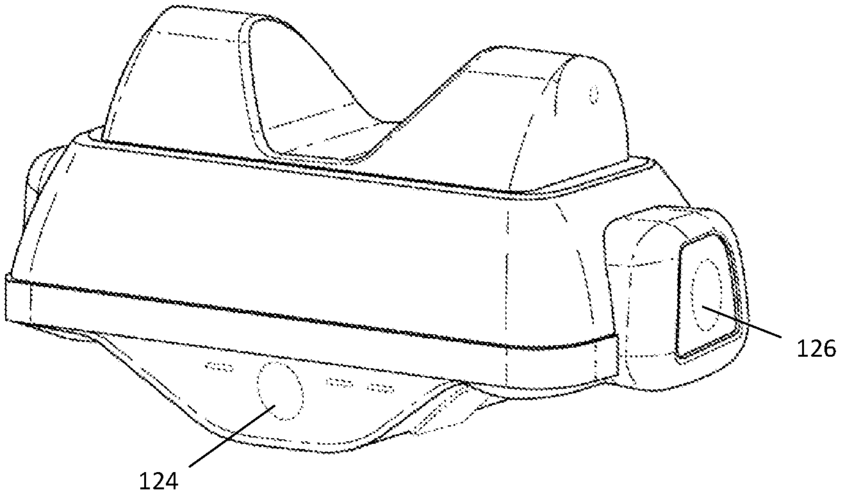
FIG. 1B illustrates a front-perspective view of an example camera device for capturing images of an operator of a vehicle and/or an outward scene of a vehicle in accordance with certain aspects of the present disclosure.
Figure 1C:
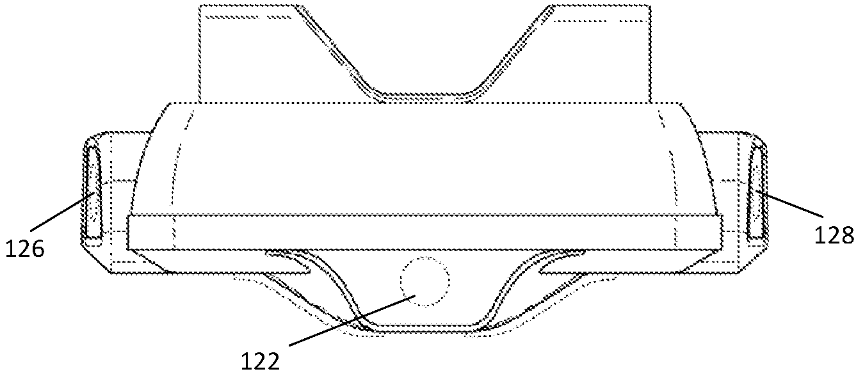
FIG. 1C illustrates a rear view of the example camera device of FIG. 1B in accordance with certain aspects of the present disclosure.

FIG. 1B illustrates an embodiment of a device with four cameras in accordance with the aforementioned devices, systems, and methods of determining and/or providing alerts to an operator of a vehicle and/or a device of a remote driver monitoring system. FIG. 1B illustrates a front-perspective view. FIG. 1C illustrates a rear view. The device illustrated in FIG. 1B and FIG. 1C may be affixed to a vehicle and may include a front-facing camera aperture 122 through which an image sensor may capture video data (e.g., frames or visual data) from the road ahead of a vehicle (e.g., an outward scene of the vehicle). The device may also include an inward-facing camera aperture 124 through which an image sensor may capture video data (e.g., frames or visual data) from the internal cab of a vehicle. The inward-facing camera may be used, for example, to monitor the operator/driver of a vehicle. The device may also include a right camera aperture 126 through which an image sensor may capture video data from the right side of a vehicle operator's Point of View (POV). The device may also include a left camera aperture 128 through which an image sensor may capture video data from the left side of a vehicle operator's POV. The right and left camera apertures 126 and 128 may capture visual data relevant to the outward scene of a vehicle (e.g., through side windows of the vehicle, images appearing in side-view mirrors, etc.) and/or may capture visual data relevant to the inward scene of a vehicle (e.g., a part of the driver/operator, other objects or passengers inside the cab of a vehicle, objects or passengers with which the driver/operator interacts, etc.).

Figure 2:
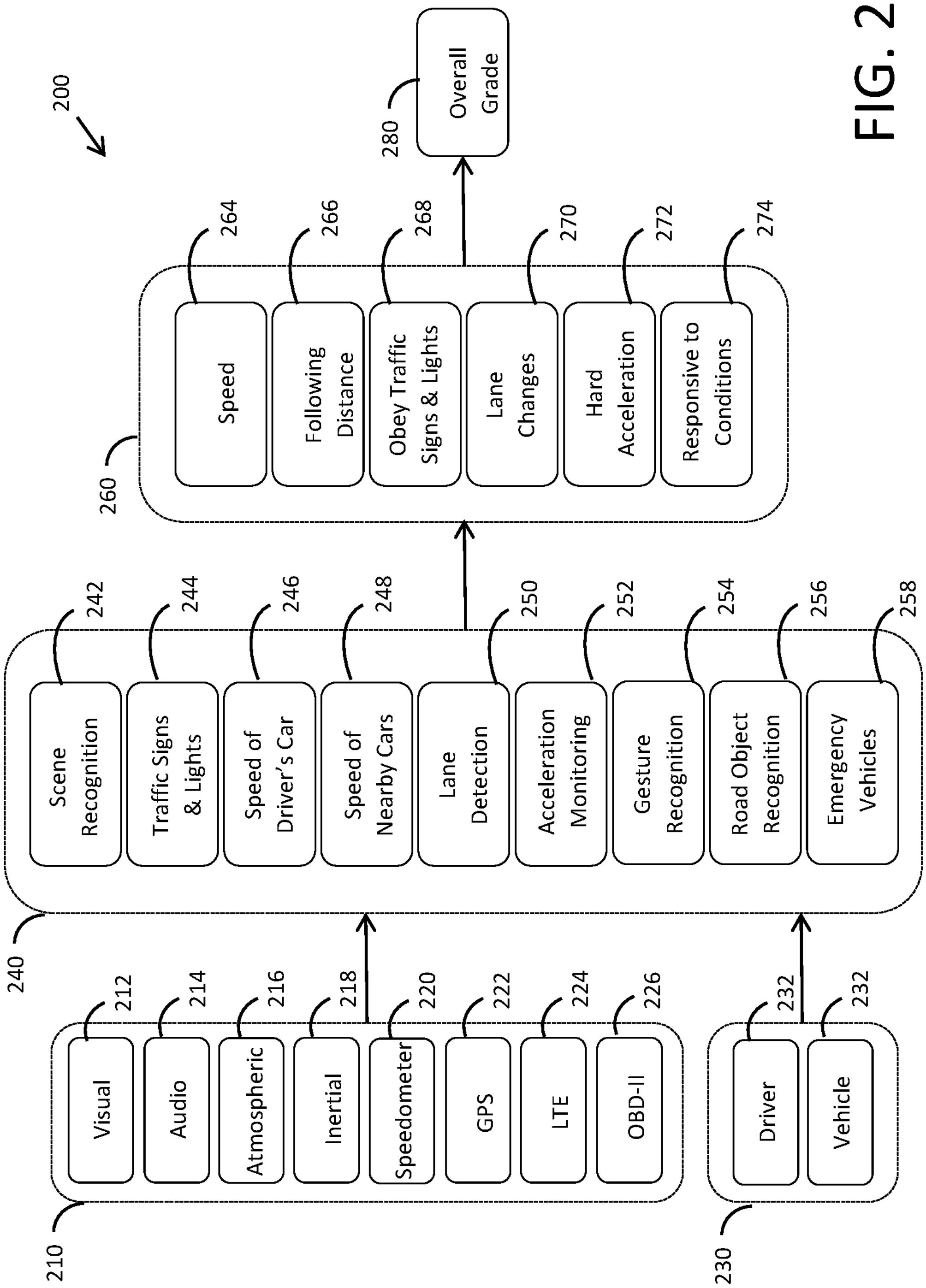
FIG. 2 illustrates a block diagram of an example system of vehicle, driver, and/or outward scene monitoring in accordance with certain aspects of the present disclosure.

A system for determining, transmitting, and/or providing alerts to an operator of a vehicle and/or a device of a remote driver monitoring system, in accordance with certain aspects of the present disclosure, may assess the driver's behavior in several contexts and perhaps using several metrics. FIG. 2 illustrates a system of driver monitoring, which may include a system for determining and/or providing alerts to an operator of a vehicle, in accordance with aspects of the present disclosure. The system may include sensors 210, profiles 230, sensory recognition and monitoring modules 240, assessment modules 260, and may produce an overall grade 280. Contemplated driver assessment modules include speed assessment 262, safe following distance 264, obeying traffic signs and lights 266, safe lane changes and lane position 268, hard accelerations including turns 270, responding to traffic officers, responding to road conditions 272, and responding to emergency vehicles. Each of these exemplary features is described in U.S. patent Ser. No. 10/460,400, entitled "DRIVER BEHAVIOR MONITORING", filed 21 Feb. 2017, which is incorporated herein by reference in its entirety. The present disclosure is not so limiting, however. Many other features of driving behavior, including particularly identified combinations of features of driving behavior, may be monitored, assessed, and characterized in accordance with the present disclosure.

Enhanced Alerts

Intelligent in-cab warnings may help prevent or reduce vehicular accidents. In-cab warnings of unsafe events before or during the traffic event may enable the driver to take action to avoid an accident. In-cab messages that are delivered shortly after unsafe events have occurred may still be useful for the driver in that, in comparison to a delay of several hours or days, a message presented soon after an event is detected by an in-vehicle safety device may enhance the learning efficacy of the message. For example, the driver may to self-coach and learn from the event and how to avoid similar events in the future. Likewise, risk mitigating behaviors by the driver may be recognized as a form of positive feedback shortly after the occurrence of the risk mitigating behavior, as part of a program of positive reinforcement. With respect to positive reinforcement as well, positive valence messages that are delivered to a driver soon after an event warranting positive feedback is detected may be an engaging and/or effective tool to shape driver behavior.

Industry-standard ADAS in-cab alerts based on the outward environment include forward collision warnings (FCW) and lane departure warnings (LDW). In-cab alerts based on the inward environment may incorporate detection of drowsy driving. A National Transportation Safety Board (NTSB) study found that many drivers disable current state-of-the-art LDW systems due to too many unhelpful alerts. First, current alerting systems may "cry wolf" too often when they are not needed, and cause drivers to ignore or turn-off the alerts, thereby reducing or eliminating their effectiveness. Second, certain unsafe driving situations may not be accurately or robustly recognized, such that the alert system is not activated in certain situations when it should be. As described in PCT application PCT/US19/50600, entitled "INWARD/OUTWARD VEHICLE MONITORING FOR REMOTE REPORTING AND IN-CAB WARNING ENHANCEMENTS", filed Sep. 11, 2019, which is incorporated herein by reference in its entirety, determinations of an inward and visual scene may be combined with determinations of an outward visual scene to improve in-cab alerts. For example, an earlier warning may be provided if the driver is distracted or it is otherwise determined that the driver is attending to what is happening. Likewise, the driver may be given more time to respond to a developing traffic situation if the driver is determined to be attentive. In this way, unnecessary alerts may be reduced, and a greater percentage of the in-cab feedback messages may feel actionable to the driver. This may, in turn, encourage the driver to respond to the feedback attentively and to refrain from deactivating the in-cab alert system.

In some embodiments, an "alert" may refer to a driving event for which in-cab feedback is generated and/or a report of the driving event is remotely transmitted. In some embodiments, the term "alert" may also refer to co-occurring combinations of driving events that are reported to a remote device according to rules or parameter values that differ in some way from the individual driving events that make up the combination.

In addition to a modification of an alert trigger threshold based on whether the driver is determined to be looking in a particular direction or range of directions, there are additional refinements disclosed herein which may increase the utility of IDMS, ADAS, and/or autonomous driving system alerts, among other uses. In particular, according to certain aspects, detection of a combination driving event, or two driving events of different classes that are observed to co-occur, a message that is transmitted to a remote device in support of an IDMS feature may be modified, enhanced, or suppressed. Accordingly, data that is transmitted may be more actionable to remote safety managers, insurance auditors, as well as the driver herself, as the reports that actually are uploaded tend to be more actionable.

In some embodiments of the present disclosure, a report of a detected driving event may be based in part on a co-occurrence of another detected driving event around the same time. Likewise, a remote report of a driving event may be based in part on an environmental context. In either case, the co-occurrence of the event or the environmental context may be compounding, redundant, or substantially independent in its effect on risk. Depending on the classes of the co-occurring driving events that make up a combination driving event, the effect on a determined risk level may modify one or several aspects of how and when a triggered alert is presented to the driver, a safety manager, or another appropriate third-party.

Structuring Combination Alerts for Interpretability

By identifying a subset of combination driving events that are thought to be predictive of enhanced risk (or, alternatively, indicative of positive driving behavior), a system in accordance with certain aspects of the present disclosure may reduce a burden on a user of the system. Where there are N driving events, all combinations of just two events may result in N*(N−1) combinations. Similarly, all combinations of three events may result in N*(N−1)*(N−2) combinations. For even small values of N, consideration of all possible combinations may be so burdensome to a user as to counteract the value that may be derived from consideration of combinations. Accordingly, certain aspects of the present disclosure are directed to identifying subsets of combination alerts so that the total number of combinations that are presented to the user may be substantially less than the number of all possible combinations.

Certain aspects of the present disclosure are directed to classifying particular combinations of driving events as linear, super-linear, or redundant. The linear class may correspond to combinations for which the risk associated with the combination is substantially similar to the sum of the risks associated with each individual element. The super-linear class may correspond to combinations for which the risk associated with the combination is substantially greater than the sum of the risks associated with each individual element. The redundant class may correspond to combinations for which the risk associated with the combination is substantially similar to the risk associated with any element of the combination observed alone. When two elements of a combination occur together frequently, and the absence or presence of one element does not substantially alter the overall determined risk level, such elements may be considered redundant.

In the design of a remote reporting system, which may be referred to as a triggered alert system, that treats various pre-defined combinations of driving events differently, it may be challenging for a user (driver, safety manager, and the like) to learn or understand the multitude of potential risk modifiers and how they interact to trigger reports. If the number of combinations is too large, or if the number of modifiers that may apply to the processing of any one driving event type is too large, the effective use of co-occurring contextual information may be diminished or lost, due to potential confusion. If an alert trigger is based on several different factors, or if the effects of individual modifying factors vary with too fine a granularity, and the like, it may be challenging or confusing to understand why an alert was or was not triggered in any given situation. For example, a driver may not understand why video of a first driving event was automatically transmitted to a remote server where it can be observed by a safety manager, but video of a second event was not, when the two events were largely similar. Aspects of the present disclosure, therefore, are directed towards focusing the potential risk modifiers to a number (and/or with a structure) that may be readily learned and understood by an end-user of the system. Accordingly, certain aspects of the present disclosure are directed to identifying certain combinations of driving events that may be useful to a driver of a vehicle. In some embodiments, driving events may be usefully combined with certain predetermined environmental contexts. Such combinations may be used to improve the safety of a driver, among other uses, because the logic used by in-vehicle safety system may be more interpretable, based on certain aspects of the teachings disclosed herein.

In some embodiments, a processor may be configured to compute estimates of statistical relationships between combinations of driving events that may individually trigger remote reporting, as well as with environmental contexts and/or other driving events that usually do not individually trigger remote reporting. For example, for every pair of driving events that may or may not individually trigger remote reporting, a combination driving event may be defined as the co-occurrence of a first driving event and a second driving event or that occurs within 15 seconds. Over a collection of billions of analyzed driving minutes and thousands of collisions, certain patterns may emerge. In one example, a co-occurrence of particular driving events (e.g. event 'E1', and event 'E2') may be observed to correlate with a future collision at a rate that exceeds a baseline risk level. Further analysis of such a combination may reveal that the risk is elevated above a threshold amount when the two events occur within three seconds of each other. Alternatively, further analysis may reveal that the risk is elevated above a threshold when event E1 occurs up to five seconds before event E2 and up to 1 second after event E2, but that it drops below the threshold beyond these intervals. Accordingly, a time interval between the two driving events may be determined and then subsequently applied to a safety system operating in the field, so that future detections of both events within the identified (now "predetermined") time interval, may trigger a report of the combination, or of one or both of the events that make up the combination. In this way, a predetermined time interval need not be symmetric, and instead may reflect that one of the two events tends to precede the other, or at least that collision risk is higher when the events are so ordered.

In some embodiments, particular combinations of driving events and/or environmental contexts may be identified by a computing process, which may be considered a background process, based on a computed statistical relationship between each candidate combination and the likelihood of collision. In some embodiments, a set of candidate combination alerts so identified may then be clustered. The clustering may be useful, for example, to identify patterns among the identified combinations. Such patterns, in turn, may facilitate communication of risky combinations to a driver or other end user of the system. For example, an enabled system may be configured such that a subset of the identified patterns is presented to an end user of the system as a related group or family combination driving alerts.

As an example of a family of combinations of driving alerts that have been identified, a family of driving alerts may be related in that each combination includes a traffic sign or a traffic light. In this example, modifying co-occurring events may be distracted driving in combination with a traffic light violation; distracted driving in combination with a stop sign violation; speeding in combination with a traffic light violation (which may tend to occur on major suburban roads); and hard turning violations combined with an otherwise compliant traffic light event (which may occur when a driver makes a left turn guarded by a green or yellow arrow, but does so in a way that may be unsafe and/or cause excess wear to a vehicle. In this example, by virtue of relating these various combination alerts, a driver may be instructed in ways to improve safety around intersections, based on video data of the driver captured at a time when she was exposed to various heightened risks. Such feedback may be more effective at changing a driver's behavior than would be similar time spent on intersection violations that are associated with average risk (no modification by a co-occurring event) or un-clustered combination alerts.

Another identified family of combination driving alerts may involve speeding and on other driving event, such as following too close, or speeding and weaving. In this example, combination alerts may serve to focus data bandwidth usage to retrieve example of speeding that are associated with enhanced risk. Accordingly, a driver who reviews such videos be more motivated to modify speeding behavior than he might be if he had spent the same time reviewing video of him speeding on wide-open roads, where the risks of speeding may be less apparent.

In some embodiments, a computing process may identify a number of driving events each having associated risk, and such that the risk of the combination increases in a super-linear fashion with respect to the underlying driving events. In one example, a background computing process may identify Driver Drowsiness as a reference alert. Driver Drowsiness may be detected when the driver exhibits yawning, extended blinking, droopy eyes, reduced saccadic scanning, a slouched pose, and the like. The computing process may identify that Driver Drowsiness that occurs at a time that overlaps with Speeding, Following Distance, Lane Departure, and/or Lane Change events, combine in a super-linear fashion with respect to collision risk. Because all of these combination alerts relate to each other through the reference alert, Driver Drowsiness, these combination alerts may be presented to an end-user in a way that anchors these various combinations to the reference alert. This may be an example of selecting a subset of combination alerts based on the structure of statistical relationships between the elements of the combinations.

Similarly, a set of combination alerts involving Driver Distraction alerts (e.g. texting, looking down), may be presented to a driver in a manner that is anchored to the reference Driver Distraction alert. In this way, a user may quickly identify occurrences of the reference alert that are associated with elevated levels of risk. In the context of a coaching session, such occurrences may be an effective tool for illustrating the risks associated with the behavior. While distracted driving, by itself, contribute more than other factor to collision risk, there may be certain co-occurring events that are associated with ever higher levels of risk.

Accordingly, a family of distracted driving combination events may include: distracted driving and insufficient following distance; distracted driving and speeding; and distracted driving and weaving.

In some embodiments, detection of combination driving events may be used to further categorize one of the underlying driving events. In one example, a Hard-Braking alert that is preceded by Driver Distraction may be flagged for review by a safety manager. Hard-braking by itself may indicate that the risk of collision has manifested into an actual collision event or a near-miss. The presence or absence of certain other driving events may modify reporting of hard braking events. For example, hard braking combined with speeding or distracted driving may be prioritized for review by a safety manager and/or coaching. Combination events that include hard braking and following too close may be used as warning videos for a different driver who has a tendency to drive too close to other vehicles, even if that driver has not yet experienced a collision or near-miss. A Hard-Braking alert that is preceded by a sudden visual detection of a vehicle emerging from an occluded driveway may be automatically converted to a positive driving event. According to certain aspects, therefore, a positive driving event, which may be referred to as a Driver Star, may be automatically recognized when an otherwise unsafe driving event is detected in combination with another predetermined driving event.

In some embodiments, the way that risk combines in a particular defined combination alert may impact how the detection of that combination affects an aggregate driving assessment, such as a GreenZone® score. For example, combinations from the super-linear class may be treated with a separate weighting from the detection of the individual elements, whereas combinations from the linear class may be treated as if the two elements occurred at different times. Furthermore, combinations from the redundant class may be treated in such a way that a detected combination is not effectively double counted, triple counted, or may otherwise be summed together sub-linearly.

Certain aspects of the present disclosure are directed towards effective use of co-occurring events in monitoring risk, which may include determining when to generate a remote report that may be reviewed at a later time, when to generate immediate feedback, and/or when to engage safety systems on the vehicle, such as automatic braking, braking preparation, avoidance maneuvers, and the like.

Joint Event Alerts

According to certain aspects, specific combinations of detected driving events (which may individually trigger a remote report) may be treated as a separate class of driving event for the purposes of in-cab feedback, remote transmission of a report of the event, and the like. When two detectable driving events occur close to each other in time, there is the potential for a super-linear compounding of risk, such that the combination of events may be considered not just a mixture, but a difference in kind.

In one example, texting on one's cell phone while driving may a detectable driving event that may trigger an remote report of distracted driving. In addition, driving through an intersection having a stop sign without coming to a complete stop may be considered a detectable event that may trigger an remote report of a sign violation. If both of these events are detected over a short time span (such as 3 seconds) the combined event may be treated as a separate category of risky behavior, because the combination of the two events may be associated with substantially higher risk than the sum of the two events considered independently. That is, driving through a stop sign intersection without stopping may be considered mildly risky, as may quickly checking one's cell phone while driving. Driving through an intersection without stopping, and at the same time checking one's cell phone, however, may be considered highly risky due to the potential risks associated with a failure to notice cross-traffic at the intersection. By calling out such combinations, a safety system may focus be more effective per unit of time, per unit of data bandwidth, and the like, than it would be if such combinations were not highlighted. In some embodiments, a safety system may be configured so that video data of combination events may be more readily transmitted to a remote device than the constituent driving events observed in isolation.

Detection of certain driving events may include detecting a moment at which a violation was committed and may further include typical contextual time before and after that moment. For example, a typical stop sign violation may be detected as occurring at the time that the driver passed the stop sign (the time that the driver passed a stop line associated with the stop sign, the time that the driver passed a location near the stop sign where other drivers tend to stop, and the like). The stop sign violation event, however, may include a twelve second period before the identified time, as well as five second afterwards. A typical video data record of the event might encompass these 17 seconds.

Detection of certain other driving events may be long duration, such that it may be impractical or inefficient to transmit video records of the entire duration. Speeding events, for example, may sometimes stretch for many minutes. According to certain aspects, a combination driving event that includes speeding event in combination with another event (such as distracted driving) may be characterized by a duration of when the two alerts overlapped in time. Accordingly, the combination alert may be shorter and/or more focused than the underlying speeding alert.

Figure 3:
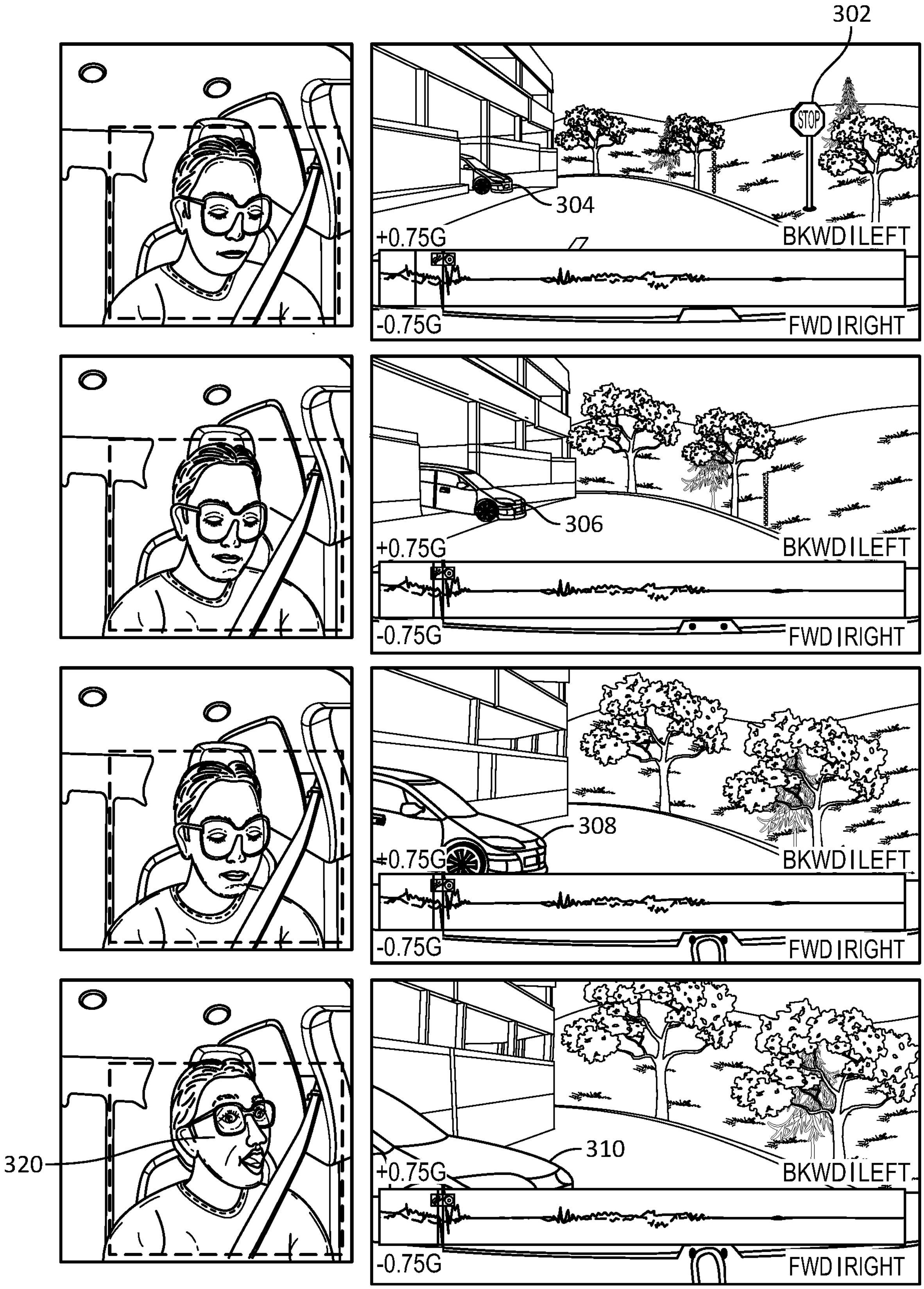
FIG. 3 illustrates an example of a no-stop stop sign violation combined with distracted driving.

FIG. 3 illustrates an example in which a driver distraction event was detected at a time that overlapped with a stop sign violation. In this example, both the stop-sign violation and the driver distraction event may be short duration events, lasting less than ten seconds each. According to certain aspects, each event may have a typical context defined, and for such combinations, the duration of the combination event may include both context periods, and may furthermore, fill in any gap period between the two events. Thus, for some classes of combination events, the duration of the combination event may be longer than the sum of both of the underlying events combined. One practical effect of such combination event specifications is that video data records of the events that make up the combination event may be substantially longer than they would be otherwise. In the example illustrated in FIG. 3, however, the driver distraction event and the stop sign violation event occurred at almost the same time.

The panels on the left of FIG. 3 show a portion of an interior view of a vehicle. The panels on the right show a portion of an exterior view of the vehicle. Each left and right pair of images corresponds to a moment in time, with the top pair of images captured first. As can be seen in the top right image, this sequence of images begins with the driver approaching a stop sign 302 that is placed across from an exit of a parking structure. As the driver is approaching the stop sign 302, a front portion of a vehicle 304 can be seen coming out of the parking structure on the left. In the second row of images, captured about 1 second after the time that the images in the first row were captured, a larger portion of the vehicle 306 has become visible, consistent with the vehicle 306 exiting the parking structure. In the second exterior view image, the stop sign is no longer visible, indicating that the driver has passed the stop sign. In the third row of images, captured about 1 second after the time that that images in the second row were captured, the vehicle 308 can be seen continuing to drive forward and turn left, such that it is now in the path of the vehicle from which these images were captured. The view on the right has also changed, indicating that the driver has continued to drive forward without stopping at or near the stop sign. In the first three interior frames corresponding to these external scenes, the driver may be observed looking down in a manner consistent with texting on a smart phone and is in any case not looking in the direction that she is driving. In the fourth row of images, captured shortly after the third row of images were captured, the driver finally looks up and exhibits a surprised and worried expression 320. At this point in time, the other vehicle 310 is just inches away from the vehicle that has the IDMS installed. A collision occurred immediately afterwards.

The driving scenario detailed in FIG. 3 illustrates the compounding risks that may occur when a distracted driving event occurs at the time that overlaps with or occurs within a short time of a traffic violation. In this example, the traffic violation was a failure to come to a complete or partial stop at a valid stop sign, which may be referred to as a no-stop stop sign violation. While a failure to observe stop signs may be understood to correlate with collision risk on its own, it may also be appreciated that a collision at a stop sign could still be avoided if the driver is attentive to the movements of other vehicles in the intersection. In the example illustrated in FIG. 3, both vehicles were moving slowly enough that either driver should have been able to come to a complete stop and avoid the collision had he or she been aware of the movements of the other vehicle. When the driver's attention is focused elsewhere, however, such that she fails to notice the movements of another vehicle, the risk of collision is substantially higher. The compounding risks of these two events may be considered super-linear in the sense that the risk associated with jointly observed no-stop stop sign violation and distracted driving may be greater than the risk of a no-stop sign violation observed at one time added to the risk associated with distracted driving at another time.

The example illustrated in FIG. 3 is also of a type that may be simply communicated to drivers in the context of a coaching program. Many drivers would understand the logic that the risk of collision with a vehicle from cross traffic is effectively only likely at intersections of roads or driveways. Crossing through an intersection, therefore, is one of the riskiest times for a driver to be distracted from the attentional demands of driving. Likewise, a driver would understand and appreciate that distracted driving events in which the driver crossed through an intersection without looking would be considered serious in nature even if they did not happen to result in a collision.

In some embodiments, joint events comprising distracted driving and an intersection violation that did not result in a collision could be presented to a driver in a coaching session in which an example like the one illustrated in FIG. 3 (that did result in a collision) is also presented. In this way, a coaching message may be effectively transmitted to the driver, who may appreciate that the particular habit of texting while driving, especially when coupled with intersection violations, is so risky that the driver may become motivated to change this type of unsafe habit.

Refined Events and Alerts

Unsafe driving habits may form and solidify over time. Particularly in the case of stop sign violations, many drivers are observed to have a habit of failing to come to a complete stop at all stop signs. Instead, these drivers slow down to a few miles per hour at an intersection governed by a stop sign, a technique which has been given the name "rolling stop," or alternatively a "California stop," which may be an acknowledgement that many drivers in California do not actually bring their vehicles to a complete stop at stop signs. For many people, a rolling stop may never lead to a collision or even a citation, the absence of which may further reinforce the habit.

In some embodiments, a driver monitoring system and/or ADAS may treat a "rolling stop" as a full stop, such that if the driver reduces the speed of her vehicle to less than, for example, 3 mph, the system will treat the event the same as if the driver had actually come to a complete stop. This approach may be considered a loosening of the criteria of a detectable driving event, such that events that closely approximate compliance are treated as if they were fully compliant. In this way, some of the less risky stop sign violations may be automatically ignored, and the remaining violations that are observed will therefore have a higher likelihood of correlating with substantial risk. In turn, the violations that come to the attention of the driver and/or safety manager will have a greater potential to effect positive behavioral change.

Even with a less stringent definition of "full stop," however, it may still be observed that some drivers or driving cohorts fail to come to a complete stop at a rate that exceeds a given bandwidth of training resource. In the context of residential delivery, for example, a safety manager responsible for the safety of a cohort of drivers may receive reports of stop sign violation events at a rate that exceeds the amount of time that he can allocate to the review of such events.

When a driver is expected to make dozens of deliveries, often on residential streets having sparse traffic, the perceived time saving benefit of choosing to only partially observe most stop signs may outweigh the perceived safety benefit of observing stop signs with complete stops. When this occurs, there may be a different character of problem that arises at the level of delivery fleet management. When the drivers in a delivery fleet, in which the fleet comprises vehicles that are equipped with IDMS devices, commit hundreds of stop sign violations per day, the volume of video records associated with these events may overwhelm a safety manager who is responsible for ensuring compliance with safety standards. In such a case, it may desirable to filter the recorded stop sign violations so that the safety manager may focus more of his or her attention on the violations that are especially risky. Accordingly, it may be desirable to refine a characterization of stop sign alerts that include combinations of other events and contexts, so that the safety manager may be made allocate more attention to the events that are associated with the most severe levels of risk The above approach may more generally apply for any driving event for which a detection of an individual driving behaviors is known to only weakly correlate with accident risk. As alluded to above, an isolated failure to come to a complete stop at a stop sign may only weakly correlate with accident risk. Certain aspects of the present disclosure, therefore, are directed to refining a set of criteria associated with the detection of driving events (including stop sign violations) and/or determinations regarding whether, when, or how detected events should be presented to the driver.

Accordingly, an IDMS may identify specific incidents that may be more relevant for coaching a driver.

In some embodiments, a lane change may only weakly correlate with accident risk, but a lane change event that occurs at substantially the same time as a distracted driving event may be associated with a level of risk that exceeds the individual risk of distracted driving summed together with the risk associated with a lane change. Likewise, driving through an intersection after complying with a traffic signal (e.g. stop sign, traffic light, yield sign) may be weakly correlated with collision risk, but the same event when combined with Distracted Driving may be associated with elevated risk owing to the possibility of cross-traffic at the intersection.

According to certain aspects of the present disclosure, environmental context may be used to modify the determined riskiness of a driving event. In the case of stop sign behaviors, stop sign crossings may be considered riskier depending on the amount of traffic present in the cross road, whether there is a clear view of traffic on the cross road, the number of lanes of traffic on the road of approach, the number of lane of traffic on the cross road, whether the intersection is a T-junction, whether the driver is on a major road or an auxiliary road, the status of the crossroad, and the like. In the example illustrated in FIG. 3, there was traffic present on the cross road; the intersection could be considered a T-junction; and the visibility toward traffic on the crossroad was generally poor as it was partially obstructed by the walls of the parking structure.

In some embodiments, the determination of how environmental context may be used to modify a level of risk may be based on observed correlations between behaviors and frequency of accidents. For example, it may be determined that failing to come to a complete stop is only weakly predictive of a collision when considered in the aggregate, but that failing to come to a complete stop in urban settings in which there is not a clear line of sight to cross traffic is strongly predictive of collision risk. By associating different levels of risk with similar behaviors that occur in different environmental contexts, more of the collision-predictive events may be brought to the attention of an interested party, while events may be less strongly correlated with collision risk may be automatically ignored or deprioritized. Accordingly, the criteria for stop sign alerts may be effectively refined through the consideration of a select number of environmental factors. In some embodiments, these additional criteria may operate to modify the likelihood that recorded video associated with an alert is transmitted off the device and to a remote server via a cellular connection, WiFi connection, and the like.

In the case of a determination that the driver is texting while driving, the response of an IDMS or ADAS may be usefully modified by environmental context. For example, texting while stopped at a red light may be considered less risky than texting while in a moving vehicle on an empty suburban road, which itself may be considered less risky that texting while driving in urban traffic. By assigning a different risk level for the same detected behavior in different environmental contexts, a driver monitoring system or an ADAS may focus attention of a driver (or a safety manager, an insurance agent, and the like) on the events that are associated with greater risk. In some embodiments, risk modifications associated with environmental context may be lower in magnitude than a risk modification owing to a co-occurrence of a separately triggered event, as described above in reference to FIG. 3. In some embodiments, an environmental context may refer to a road geometry.

In some embodiments, a goal of a driving trip may be considered an environmental context that acts as a risk modifier in combination with a traffic event. It may be observed, for example, that certain residential delivery persons commit stop sign violations at a high rate during the course of making deliveries in suburban residential neighborhoods in the middle of the day. Previously observed data may indicate that stop sign violations in these circumstances are not strongly predictive of accident risk, and/or that the likelihood and extent of damage of an accident in such a circumstance is acceptably low. As such, an IDMS may determine that certain environmental criteria are met by virtue of the driver having a goal of making residential deliveries to residential addresses on roads having generally low traffic density, at a time of day in which there is abundant daylight, and that is not associated with rush hour traffic. When such a determination is made, detected stop sign violations may be associated with a lower determined risk. In this way, stop sign violations that occur during rush hour, for example, may be more likely to catch the attention of a safety manager. This may also focus the safety manager to situations where she should intervene.

In some embodiments, in-cab feedback may be attenuated at times and in contexts associated with low levels of risk. For example, no-stop stop-sign violations that are: from one empty suburban road to another; where there is clear visibility of the perpendicular road; and where the driver looked both ways before making the turn, may be ignored, such that no audible alert is sounded. In some embodiments low risk events may be indicated by a visual alert, while higher risk events may be indicated by an audible alert. This distinction may cause, by way of contrast, the driver to be more attentive to audible in-cab feedback that is delivered at other times.

Figure 4:
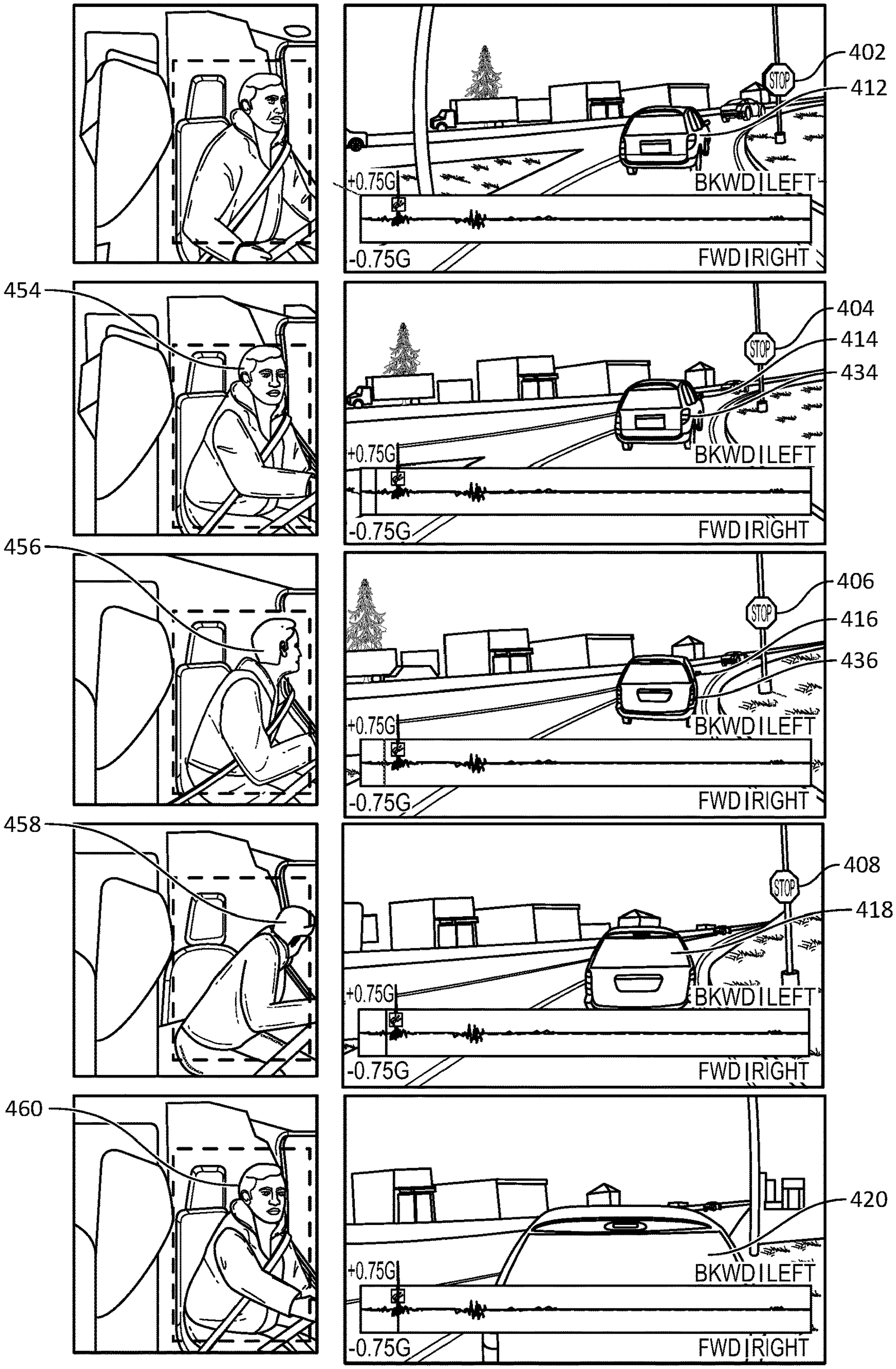
FIG. 4 illustrates an example of a driver accelerating in a manner consistent with a no-stop stop sign violation, combined with a driver failure to check that a driving path is clear before accelerating on to a main road.

FIG. 4 illustrates an example in which a stop sign violation alert occurred at an entrance ramp to a main road. In this example, the driver looked to the left towards traffic on the main road but failed to ensure that the entrance ramp was clear before he attempted to merge on to the main road. Following the same layout as FIG. 3, in FIG. 4 the panels on the left show a portion of an interior view of a vehicle that includes a driver. The panels on the right show a portion of an exterior view of the driver's vehicle. Each left and right pair of images corresponds to a moment in time, with the top pair of images captured first. As can be seen in the top right image, this sequence of images begins with the driver approaching a stop sign 402 that is on the right side of an entrance ramp. At the time corresponding to the top row, there is a minivan 414 ahead of the driver's vehicle. In the second row of images, captured less than a second after the first row, the stop sign 404 is now larger and in a more eccentric position in the frame, indicating that the driver's vehicle is now closer to the stop sign 404. The minivan 414, however, is approximately the same size and is in approximately the same location in the second row image as the minivan 412 appeared in the first row image, indicating that the driver's vehicle and the minivan 414 maintained an approximately constant distance from each other between the times corresponding to the first row and the second row. It may therefore be inferred that the driver's vehicle and the minivan 414 were travelling at approximately the same speed from the time corresponding to the first row and the time corresponding to the second row. In some embodiments, this inference may be based on bounding boxes associated with the tracked vehicle across frames. It is also apparent from the second row that, at the second time, the minivan 414 had not yet crossed the stop sign 404 on the entrance ramp. The interior view in the second row shows that the driver 454 was looking in the direction of the minivan 414 at this time.

The images in the third row of FIG. 4 were captured less than a second after the images illustrated in the second row. At this third time, the driver 456 is looking to his left, in the direction of traffic on the road into which he was intending to merge. Unfortunately, this is the same time at which the rear brake light 436 of the minivan 416 first illuminates, indicating that the minivan 436 has initiated braking. Because the minivan 416 as captured in the third row is approximately the same size as the minivan 414 captured in the second frame, it may be inferred that the minivan had continued to maintain a speed approximately equal to the driver's vehicle from the second time (associated with the second row) to the third time. Furthermore, both vehicles were moving forward as can be inferred from both positional sensors on the driver's vehicle and/or the changing size and position of the detected stop sign 408 in the frame. Still, the minivan 416 has not yet crossed the stop sign 406, so the minivan's decision to stop could have been anticipated.

The images in the fourth row of FIG. 4 illustrate how different factors combined to create the conditions of a low-speed collision. The driver 458 is at this fourth time looking to his left in an exaggerated fashion. Meanwhile, the minivan 418 is still braking. The stop sign 408 is larger and more eccentric than the stop sign 406 as detected earlier. The driver has also increased his speed from 6 mph to 8 mph. In this example, the images were captured by an IDMS that did not include in-cab audio feedback.

An ADAS with audio feedback, in accordance with certain aspects, may have triggered a warning sound at a time corresponding to the third or fourth rows of FIG. 4. Alternatively, or in addition, an ADAS may have initiated a braking or evasive maneuver, primed the brakes, or the like. According to certain aspects of the present disclosure, based on the recognition of the road merge context, the ADAS feedback may be triggered sooner than it would have been had the driver been looking forward at the relevant times.

The images in the fifth row of FIG. 4 were captured just prior to a collision. At this point, the minivan 420 is so close that only the upper portion is visible in the frame. The driver 460 has finally returned his gaze to his path of travel, but at this point it is too late to avoid a collision.

The situation illustrated in FIG. 4 is an example of a risk modifier that may be a behavioral (driving) event, where the behavioral event (merging from an entrance ramp) is not independently considered to be the basis of a triggered alert in an IDMS. When merging from an entrance ramp, it may be advisable for a driver to "look both ways." A determination that the driver has looked both ways may be based on separate determinations that the driver was determined to have looked in the direction of trailing traffic and in the direction in which the driver intends to travel.

The situation illustrated in FIG. 4 may also be considered an example of a risk modifier that may be an environmental context. It has been observed that merge zones are associated with an increased risk of collision relative to other sections of roadway. In some embodiments, there may be an increased risk associated with a stop sign violation, such as the stop sign violation illustrated in FIG. 4, by virtue of it occurring at an entrance ramp merge zone. In some embodiments, an ADAS may operate with reduced thresholds in such environments, such that, relative to other contexts, a shorter period of looking away from the direction of travel may be sufficient to trigger an audio alert. In this way, a system enabled with certain aspects of the present disclosure may operate in a modified fashion in various contexts.

As shown in FIG. 4, the configuration of the entrance ramp, main road, and stop sign may be considered a location associated with an increased risk of collision. Alternatively, or in addition, a scene that includes a stop sign and a vehicle in the same lane as the driver and that is approaching the same stop sign, may be considered an environmental scene that is associated with an increased risk of collision. In some embodiments, these factors may combine in a super-linear fashion, such that the risk associated with a vehicle in the same lane as the driver and approaching a stop sign combined with the risk associated with a stop sign merge zone configuration may be higher than the sum of the risks of either of these alone. Because the risk associated with these environmental factors may be transiently higher, a system embodied with certain aspects of the present disclosure may exhibit enhanced sensitivity to gestural events (such as looking away) at such times and in such locations. Accordingly, in-cab feedback may be presented at a lower threshold. While a lower threshold may be associated with a higher rate of "false positives," the increased risk associated with this situation may be high enough that drivers may tend to experience such feedback as useful, even if occasionally unwarranted.

A refined stop sign event may be determined based on a co-occurrence of one or more behavioral events (such as looking both ways) and a stop sign violation. In some embodiments, a stop sign violation may be considered less risky if the driver completed behavioral actions associated with looking both ways within a pre-determined time interval, such as within the two second interval before the driver entered the intersection.

While certain environmental contexts and behavioral events may act as risk modifiers that increase the risk level of a driving event, other environmental contexts and behavioral events may decrease the risk level. No-stop intersection violations (e.g. at an intersection governed by a stop sign, traffic light, or yield sign) that are: from a minor street to a major street with fast-moving traffic; where the turn is "blind" (the driver cannot see down the perpendicular road until he is close to the intersection); and/or where the driver is checking his cell phone or otherwise distracted before or during the intersection crossing, may be considered higher risk. Such higher risk combinations may correlate with risker situations that may therefore demand a higher degree of compliance with safe driving behaviors.

Higher risk combinations of alert triggering driving events and environmental factors or other behavioral events may be more predictive of accidents. In some embodiments, a determination that certain combinations are more predictive of accidents may correspond to a risk factor that may be applied.

Correctable Habits

While in some embodiments, a risk assessment may be based on a data-driven approach, such that combinations of factors that have been observed to correlate more strongly with collisions are associated with higher risk, other approaches to selecting combination alerts are contemplated. According to certain aspects of the present disclosure, specific combinations of behavioral events and environmental contexts may be considered higher risk in part because the combination is easy to communicate, to recognize, and to avoid. In this way, more emphasis may be placed on combinations that may be associated with driving habits that may be considered "correctable."

A failure to look to the side and the front ("look both ways") in a merge situation may be an example of a correctable behavior. Such combinations may indicate that the driver has a behavioral habit that should be adjusted for increased safety. For example, a habitual failure to look ahead before merging to a cross street, where the merge zone is governed by a stop sign, may be predictive of rear-end collisions. Drivers that exhibit this habit may be more likely, like the driver illustrated in FIG. 4, to experience an event in which another vehicle came to a stop at a point in time that the driver was not looking. This type of habit, however, may be recognized and corrected, without the driver having to actually experience such a collision.

In some embodiments, a detected unsafe habit of a driver, such as a habitual failure to look ahead before turning on to a major street from a stop sign controlled intersection, may cause an ADAS to proactively sound an alarm to the driver when there is a vehicle that has yet to clear the road ahead. Such an alarm may sound even though the driver has not yet accelerated onto the main road, such that the time to collision (at the pre-acceleration speed) would still be longer than a typical collision warning.

In another example, risk modifiers associated with looking at one's phone and/or looking down may depend on reaction time demands of a driving situation. In some embodiments, audio feedback to a driver or third-party may be focused on events that are riskier, and/or that occur in situations in which the driver is exhibiting an unsafe habit that may be malleable. In some embodiments, alerts may be focused on combinations of a habitual checking of one's phone that occurs in particular environmental contexts.

Figure 5A:
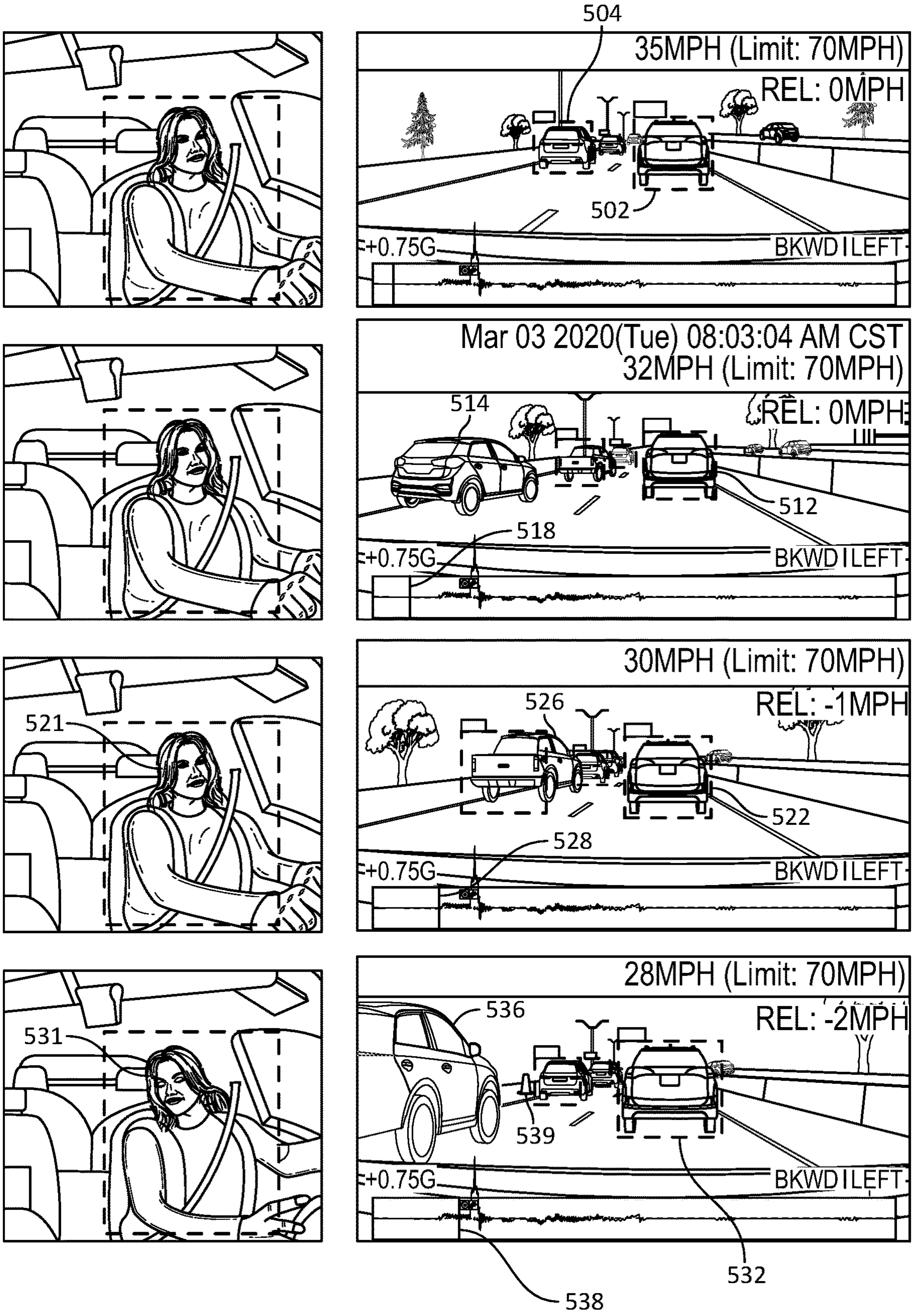
FIGS. 5A and 5B illustrate an example of when a reduced threshold evasive action or a forward crash warning (FCW) may be transmitted and/or activated in accordance with certain aspects of the present disclosure.
Figure 5B:
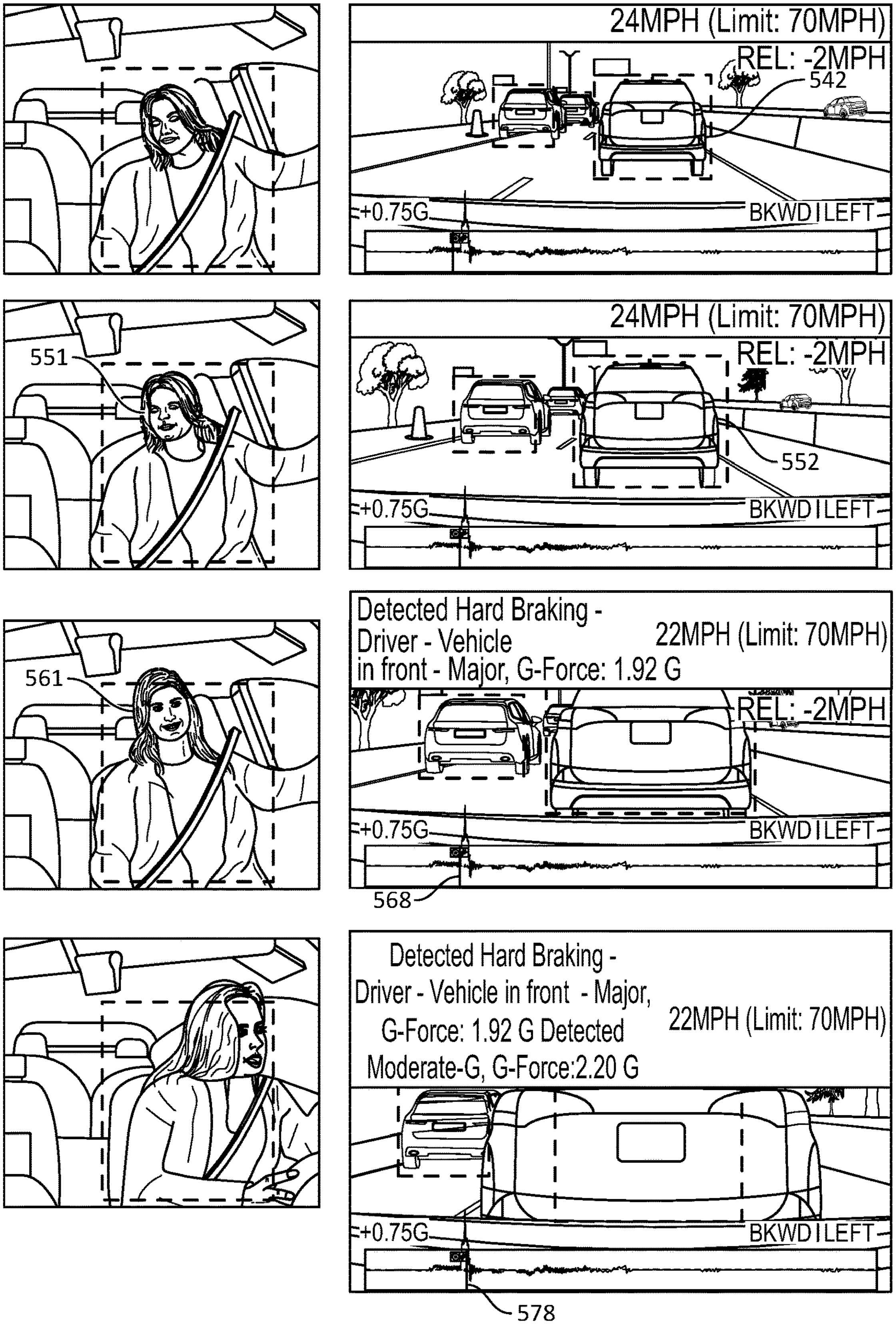

FIGS. 5A and 5B illustrate an environmental context, moderate speed stop-and-go traffic, in which the reaction time demands may be greater in comparison to driving contexts having a clear path ahead. Because the reaction time demands may be greater, even a short period of looking away from the road may be associated with substantial collision risk. The rows of images in FIGS. 5A and 5B comprise a sequence of images collected from inward facing (left) and outward facing (right) camera views. The top row of FIG. 5A corresponds to the first pair of captured images in the sequence, which will be referred to as the first time. The bottom row of FIG. 5B corresponds to the last pair of captured images in the sequence, which will be referred to as the eighth time. The remaining pairs were captured in temporal order from the top row of FIG. 5A (first time) to the bottom row of FIG. 5A (fourth time) and then the top row of FIG. 5B (fifth time) to the bottom row of FIG. 5B (eighth time).

FIGS. 5A and 5B illustrate a driver checking her phone in a context in which the reaction time demands may be higher than usual. At the first time, the driver is travelling at 35 mph in a 70-mph zone, which may be considered moderate traffic. A sport utility vehicle (SUV) 502 is present in the scene and in the same lane as the driver. At the first time, a sedan 504 is in the adjacent lane to the left. The sedan 504 is about one car length ahead of the SUV 502. At the second time, the sedan 514, which is the same vehicle as the sedan 504 observed in the top row image, is about one car length behind the SUV 512, indicating that the sedan 514 was travelling more slowly than the SUV 512 between the first time and the second time. By the third time, the SUV 522 has begun to apply the brakes.

In all of the outward facing images, a vertical bar superimposed on inertial traces at the bottom of each image indicates the time at which the image was captured. The vertical bar 518 indicates the second time, which occurs prior to any braking by the vehicle. The vertical bar 528 indicates the third time. Because the inertial trace is elevated at the location indicated by the vertical bar 528, it may be inferred that, like the SUV 522, the driver has also begun to brake at the third time. In the adjacent lane, a pickup truck 526 may be observed approximately even with the SUV 522 at the third time. At the fourth time, the pickup truck 526 is about one car length behind the SUV 532, from which it may be inferred that traffic in the driver's lane is moving faster than is traffic in the adjacent left lane. Furthermore, the size of and location of the SUV 532 is roughly the same at the fourth time as the size and location of the SUV 522 at the third time, indicating that SUV and the driver are travelling at approximately the same speed as each other between the third and fourth times. Additionally, the driver 521 is attending to traffic ahead of her at the third time, but the driver 531 at the fourth time has diverted her gaze in the direction of the passenger seat.

Referring now to FIG. 5B, the size and of the SUV 542 in the external view at the fifth time is larger than the size of the SUV 532 at the fourth time, indicating that the SUV 542 was braking faster than the driver between the fourth time and the fifth time. Likewise, the size of the SUV 552 continued to increase at the sixth time, again at the seventh time, and again at the eighth time. The eighth time in this example was just past the moment of impact. The vertical bar 568 indicates that the driver applied her brake firmly at the seventh time, which was just before the moment of impact. Furthermore, the gaze of the driver 551 was still diverted from the road at the sixth time. Her attention was finally turned back to the road at the seventh time, at which time the driver was braking but still travelling 22 mph, and a collision was no longer avoidable.

Figure 6:
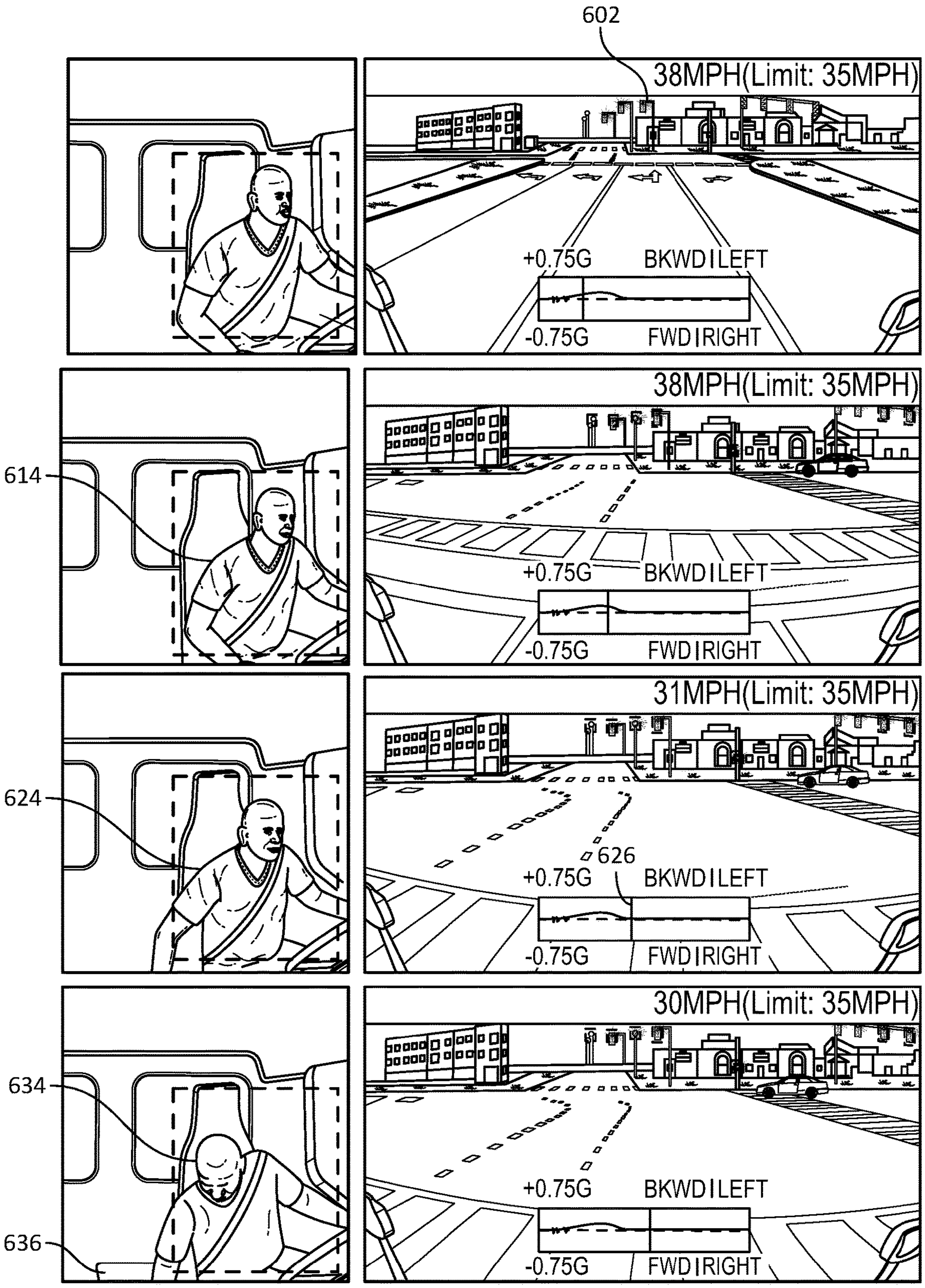
FIG. 6 illustrates an example of a driver looking away from a road for an extended period of time after coming to a complete stop at a red light.

The situation illustrated in FIGS. 5A and 5B may be contrasted with a similar behavioral (driving) event occurring in a different environmental context, which is illustrated in FIG. 6. Here, a driver is approaching a wide intersection controlled by a traffic light. At the first time, the light is illuminated red. The driver 614 reaches a maximum braking force at the second time, just before a crosswalk of the intersection. The vertical bar 626 indicates that the driver came to a complete stop by the third time, at which time the driver 624 is still looking forward in the direction of the intersection but can additionally be seen reaching in the direction of a central console between the driver and passenger seats. At the fourth time, a lid 636 of a cooler becomes visible in a location similar to where the driver 624 was reaching at the third time, and the driver 634 is at the fourth time looking away from the road and in the direction of the cooler. In subsequent frames, not shown, the driver can be seen drinking from a water bottle.

In comparison to the driver illustrated in FIGS. 5A and 5B, the driver illustrated in FIG. 6 took his eyes off of the road for a longer duration and diverted his gaze from the road to a larger extent. Comparing these two events, however, it may be appreciated that the situation illustrated in FIGS. 5A and 5B was riskier. In the event illustrated in FIG. 6, the driver waited until the vehicle came to a complete stop before diverting his gaze from the road. In contrast, in the event illustrated in FIGS. 5A and 5B the driver diverted her gaze from the road when she had started braking, but was still travelling in excess of twenty miles per hour.

The situations illustrated in FIGS. 5A and 5B and FIG. 6 may be considered to be expressions of a similar habit of taking an attentional break at a stoppage in driving. In considering many more examples, a pattern emerges in which drivers reach for a smartphone or other distraction upon reaching a stop sign, traffic light, or when stopping in stop-and-go traffic. When the driver's vehicle is no longer moving, as in FIG. 6, these times correspond to times that a collision will only occur if another object collides with the driver's vehicle. Accordingly, it may rightly be considered a safe time to divert one's gaze from the road momentarily. A problem arises, however, when the driver starts to anticipate the stoppage, and begins to habitually divert his or her gaze prior to the actual stoppage. When this habit forms, the driver may become exposed to greater amounts of risk, especially in situations in which the driver is relying on other drivers to brake in a smooth manner, refrain from last second lane changes, and the like.

According to certain aspects, stop and go traffic may be treated as an environmental context that modifies other detectable events in the direction of heightened risk. Similarly, idling at a red light may be treated as an environmental context of lessened risk. A determination that the environmental context that developed in FIG. 5A was associated with heightened risk may be based on the observation that traffic was moving between 20 and 40 miles per hour (or a similar range) on a road in which the speed limit was much higher. Alternatively, or in addition, such a determination could be based on a determination that traffic in an adjacent lane was slowing down more rapidly that the driver's lane, which may be based on the expanding bounding boxes associated with tracked vehicle, such as the sedan 504 and 514 and/or the pickup truck 526 and 536. Alternatively, or in addition, the heightened risk determination may be based on a determination that the driver is driving in a construction zone. The determination that the driver is in a construction zone may be based on a detection of a signs or objects associated with construction sites, such as the construction barrel 539, which is placed so as to reduce the number of lanes devoted to through traffic.

In environmental contexts or scenes corresponding to heightened risk, a following distance between a monitored vehicle and a second vehicle may trigger an alert when the following distance drops below a modified threshold. Similarly, according to certain aspects, a determination that a driver is distracted may modify thresholds at which other alerts are triggered. Driver distraction may be based on a determination that the driver is eating, is talking, is singing, and the like. In some embodiments, driver distraction may be determined based on a paucity of saccadic eye movements, indicating that the driver is not actively scanning a visual scene. In these examples, the driver may be looking in the direction of the vehicle ahead but may still be considered distracted. The threshold at which a following distance alert is triggered may be set to a more sensitive level than it would be if the driver were not determined to be distracted. In some embodiments, a driver may be alerted to a 1.2 second following distance when distracted or a 0.6 second following distance otherwise.

In some embodiments, a quality of an in-cab alert may be modified. For example, if the driver receives an in-cab alert at a time corresponding to a modified threshold, the tone of the alert (if audible) may be different than it would be if no threshold modifiers applied. In this way, the potentially distracted driver may be given a notification that he or she should attend more closely to the driving scene. By using a different tone, it may also be easier for the driver to understand how system thresholds relate to the driving scene. In the example of in-cab following distance alerts, the driver may develop a sense of the distances at which the system will generate an audible alert and how those distances may be different depending on the driver's level of attention. Likewise, the driver may begin to develop a sense for behaviors or alertness levels that correspond to a determination by the system that the driver is distracted.

Model Training Based on Combination Alerts

Certain aspects of the present disclosure may be directed to training a machine learning model, such as a neural network model, based at least in part on examples of combination alerts. In one example, combination alerts for which a detected Hard Braking event is preceded by Driver Distraction may be used to train a model to learn to predict when control of the vehicle should be taken from the driver. Such a model may learn to detect patterns of complex relationships between detectable elements, such as the elements identified in reference to FIGS. 5A and 5B above (slowing traffic in an adjacent lane, a construction barrel, momentary redirection of gaze, and the like), which together may indicate that the driver is failing to respond appropriately to a developing unsafe situation. Such situations, if detected, may correspond to avoidable collisions if hard braking is immediately applied.

Likewise, in accordance with certain aspect of the present disclosure, a machine learning model may be trained to identify combinations of events that precede a detected Hard Braking alert, but in which the driver is determined to be attentive to the road. In this way, the model may be trained to detect a variety of circumstances that may be surprising, even to an alert driver. In such cases, an enabled system may prime an evasive maneuver so that when the driver responds to the situation, as expected, the evasive maneuver may be more likely to result in a successfully avoided collision.

In one example, data collected from a variety of vehicles, including class 8 trucks for which a camera may be mounted higher from the road compared to other vehicles, may be used to train a model that may learn to reliably detect that traffic on a highway will suddenly slow. Such a model may then be applied to devices in other vehicles, including vehicles that may have more limited visibility in comparison to class 8 trucks, to interpret patterns of visual detections that may predict that traffic will suddenly slow. Such a model may be used as part of an ADAS to facilitate a timely response to the sudden slowing of traffic if and when it occurs. Such a model may also be used in an IDMS that includes positive recognition to determine that the driver of the vehicle reduced the speed of her vehicle in a proactive manner at an appropriate time.

Furthermore, combination alerts may include situations for which a measurement relating to one or more elements of the combination is below a threshold at which the element would be detected individually. Continuing with the example of model training, combinations of events that include a sudden reduction in speed of traffic combined with an observation that the monitored driver applied her brakes firmly, but not to such a degree as to trigger a Hard Braking alert, may be automatically detected and transmitted to a remote server. Such combination events may be used to further train a machine learning model so that it, like the driver in this example, may recognize the potential slowdown of traffic from an earlier time. Such a system could then facilitate an early response to the slowdown characterized by a gradual reduction in speed.

Enhanced Driver Assistance Based on Warning Signs

In some embodiments, driver assistance may be enhanced based on a detected presence of a warning sign. On roads in the United States, a diamond-shaped, yellow, traffic sign may indicate a potentially unexpected hazard that tends to occur at a location just beyond the sign. The placement of warning signs may be determined by local traffic engineering authorities to warn drivers who may be unfamiliar with the local area about hidden driveways, cross streets that intersect with a road at an unusual angle that might compromise visibility for some traffic, and the like.

Figure 7:
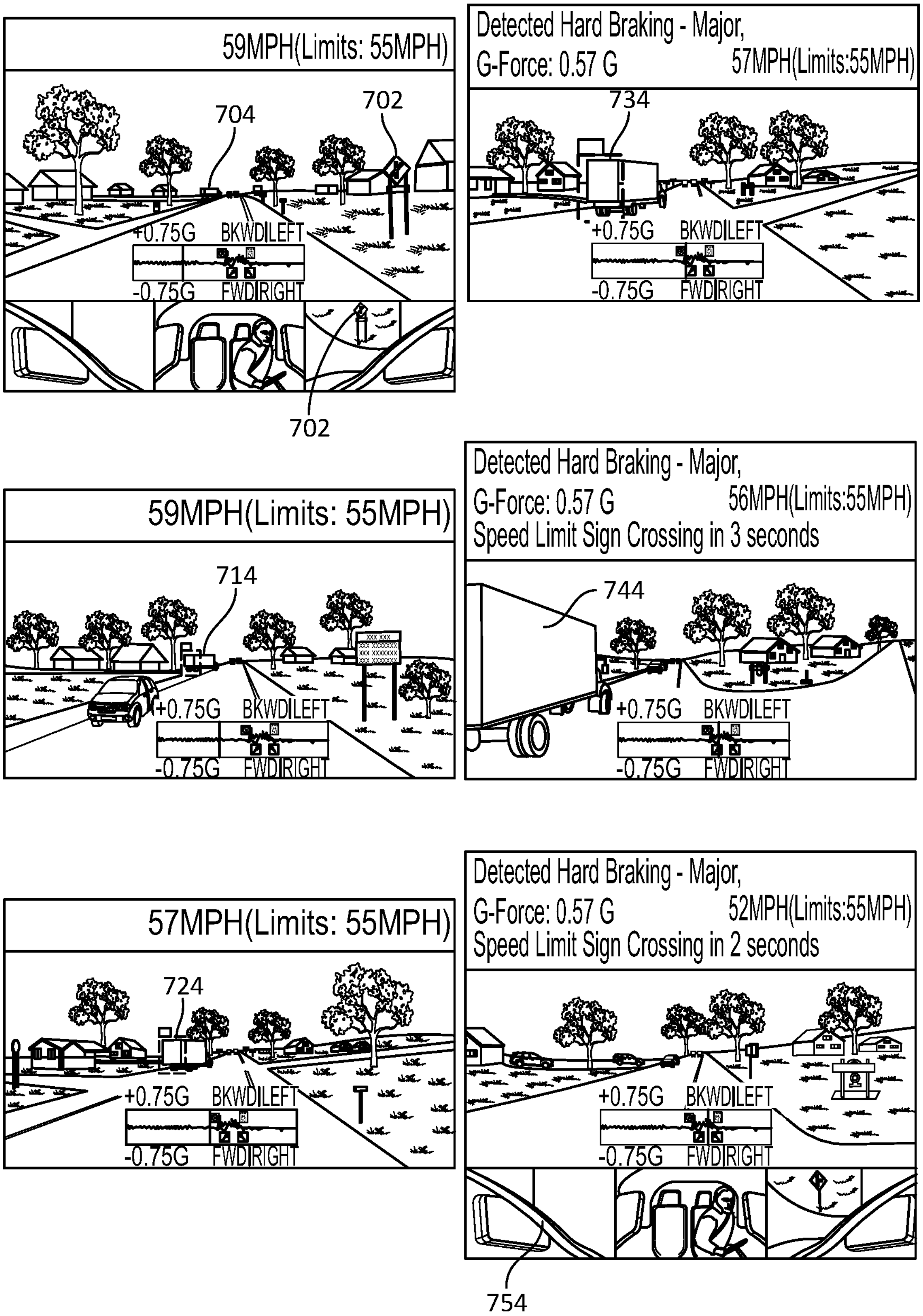
FIG. 7 illustrates an example in which a driver triggered a Hard Braking alert to avoid a collision with another vehicle at an intersection, where the intersection is hazard to which a detectable warning traffic sign refers.
Figure 8:
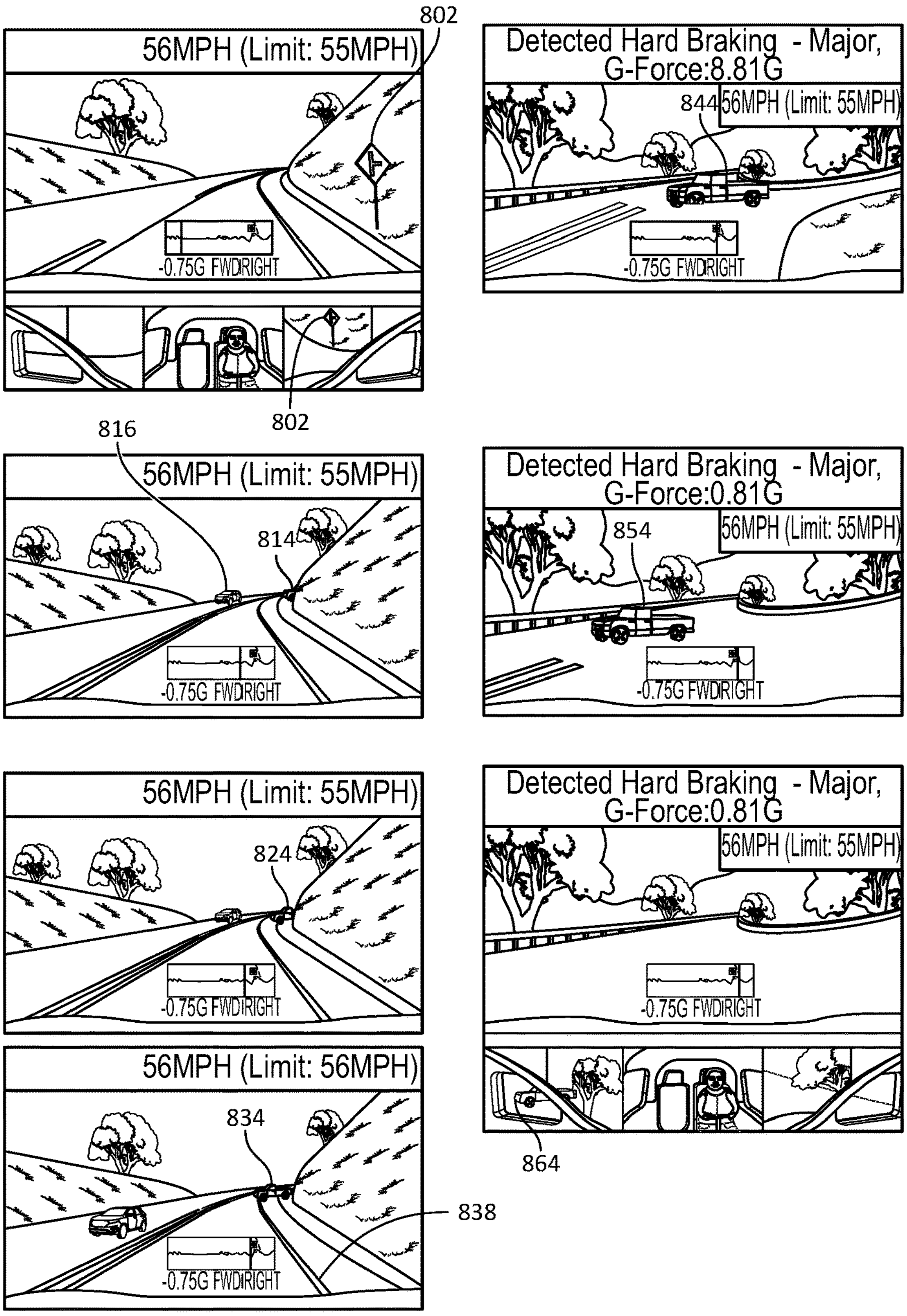
FIG. 8 illustrates an example in which a driver triggered a Hard Braking alert to avoid a collision with another vehicle at a T-intersection, where the T-intersection is the hazard to which a detectable warning traffic sign refers.

FIGS. 7 and 8 each illustrate a driving situation in which a driver avoided a collision with another vehicle by a hard application of his brakes. In FIG. 7 there are six panels depicting sequential images captured from an IDMS camera. In the first frame, a warning sign 702 that warns of a cross street at an unusual angle may be seen in both the front and right-side camera views. A box truck 704 may be seen approaching the road from the cross street that is indicated by the warning sign 702. In the next frame, the box truck 714 may be observed crossing into the road from the left, although still in the adjacent on-coming lane from the perspective of the truck having the IDMS installed. In the third frame, the box truck 724 has begun to straighten its trajectory to merge into the lane of travel of truck having the IDMS installed, which at this point is travelling at 57 mph, which is slightly higher than the speed limit of 55 mph. By the next frame, a Hard-Braking maneuver is detected by the IDMS. The front passenger wheel of the box truck 744 is crossing over the center dividing line of the two-lane road. In the fifth frame the driver has executed a lane change into a portion of the intersection corresponding to the shoulder of the road on which he is travelling. In the sixth frame, the box truck 754 may be observed in view of the left facing camera.

As can be appreciated from detailed review of the driving event illustrated in FIG. 7, the warning sign 702 may be understood to as an attempt by traffic engineers to warn the driver of the exact type of collision that the driver narrowly avoided. In this example, the warning sign indicated the presence of a cross-street at a sharp angle. From such an angle, the box truck 704 could be expected to have limited visibility of a relatively short distance down the road on which the monitored driver was travelling, as the line of sight of the driver of the box truck 704 may be cut off by the rear interior of the cab of the box truck 704 at that angle. That is, if the driver of the box truck looked out of her cab to the right, her view would not extend to the location of the monitored vehicle at the time of the first frame.

FIG. 8 illustrates a situation in which a warning sign 802, which is visible in both the front-facing and right-facing camera views, was placed so as to warn a monitored driver about a blind driveway. At the time corresponding to the second frame, the nose of a pickup truck is barely visible around a bend in the road, where the bend is accompanied by a steeply sloped hill and dense vegetation. At this point in time, it may be expected that neither the driver of the pickup truck 814 nor the driver of the monitored vehicle would be aware of each other. In the third frame, the pickup truck can be seen farther out of the blind driveway, at a time corresponding to a passing of an SUV 816 in a lane that would be considered on-coming from the perspective of the monitored vehicle. In the fourth frame, the pickup truck 834 has crossed the solid white lane boundary line 838 demarcating the right boundary of the lane of travel of the monitored vehicle. By the fifth frame the driver of the monitored vehicle has begun to apply his brakes to a degree that triggers a Hard Braking alert. At this time, the pickup truck 844 is squarely in front of the monitored driver and angled nearly perpendicularly to the path of travel of the monitored driver. By the sixth frame, owing to the continued braking of the monitored driver, the pickup truck 854 has nearly cleared the monitored driver's path of travel. Finally, in the sixth frame, the pickup truck may be observed in the left view, indicating that there was no collision.

The events illustrated in FIG. 7 and FIG. 8 were identified by a safety manager who, upon review of video associated with the detected Hard Braking event, determined that the driver's aggregate driving score (GreenZone® score) should not be negatively affected by the event, and in fact should be positively affected. In both of these instances, the safety manager made use of a "Convert to DriverStar" option to this end, which may be available within an IDMS platform, to recognize moments of exceptional driving.

According to certain aspects of the present disclosure, Hard Braking events that are combined with a detected presence of a warning sign may be considered Combination Events that are relatively likely to provide an example of the kind of unexpected hazard that the warning sign was meant to warn against. Because there may be several factors that determine the precise location of a warning sign (relative to the hazard that that warning sign indicates), and because the amount of information that may be communicated in a warning sign may be limited, it may be a challenge for an IDMS, ADAS, or Autonomous driving system, and the like, to associate a warning sign with a particular hazard and at a particular location. In the examples shown in FIG. 7 and FIG. 8, however, the warning signs appeared to warn of the particular hazard that was actually observed, and furthermore, the precise site of the hazard was closely aligned with the location at which the monitored driver triggered a hard-braking event.

Over the course of one or more observations of an evasive maneuver, such as hard braking, and/or a collision in the vicinity of a warning sign, a system in accordance with certain aspects of the present disclosure may generate and/or refine maps of hazardous locations that are known to local traffic engineers, who indicated the presence of such hazards by placing a warning sign on the side of the road. In this way, crowd-sourced observations of hard-braking events in the vicinity of warning signs may be used to localize the source of hazard to which the warning sign is directed.

Furthermore, in accordance with certain aspects of the present disclosure, a system may determine that a vehicle is travelling in the direction of a potential unexpected hazard. Such a determination may be based on a detection of the warning sign using an on-device perception engine (which may be based on a neural network trained to process images to detected road signs, among other objects), may be based on a stored map of warning sign locations, a stored map of increased risk locations, and the like, or some combination of on-device perception and access of a map. Upon determining that the vehicle is travelling in the direction of a potential unexpected hazard, a threshold corresponding to a safety function of an enabled system may be modified. For example, thresholds associated with warning a driver about distracted driving may be made temporarily more sensitive, braking systems may be primed, and the like.

In some embodiments, the detection of a warning sign may not itself cause an enabled system to generate a warning. Instead, the detection of a warning sign combined with a detection corresponding to the hazard to which the warning sign is directed could be the basis of, for example, in-cab driver feedback, transmission of a report, and the like. In the example illustrated in FIG. 7, the combination of detecting the warning sign and a detection of a vehicle travelling in a manner consistent with the box truck of that example may combine to generate an alert. Similarly, in the example illustrated in FIG. 8, the combination of detecting the warning sign and a detection of a presence of a vehicle at the warned cross-street or driveway may trigger an alert.

In this way, an enabled system may refrain from generating warning signals at times when the actual risk of collision is low.

Combination Alerts in Which an Event was Avoided

Figure 9:
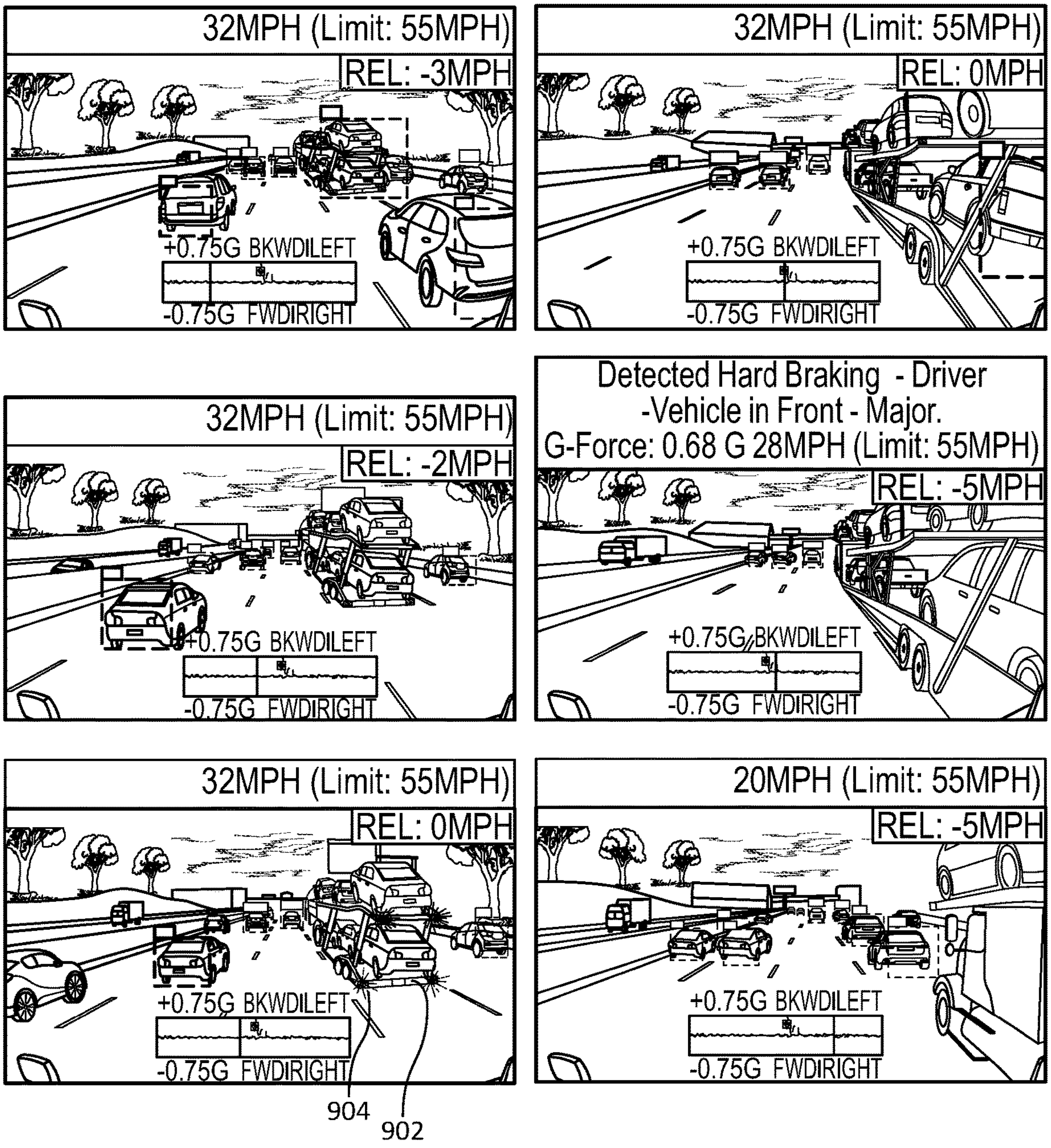
FIG. 9 illustrates an example in which a driver triggered a Hard Braking alert at a time in which it appeared that another vehicle was beginning to execute a lane change into the driver's path of travel.
Figure 10:
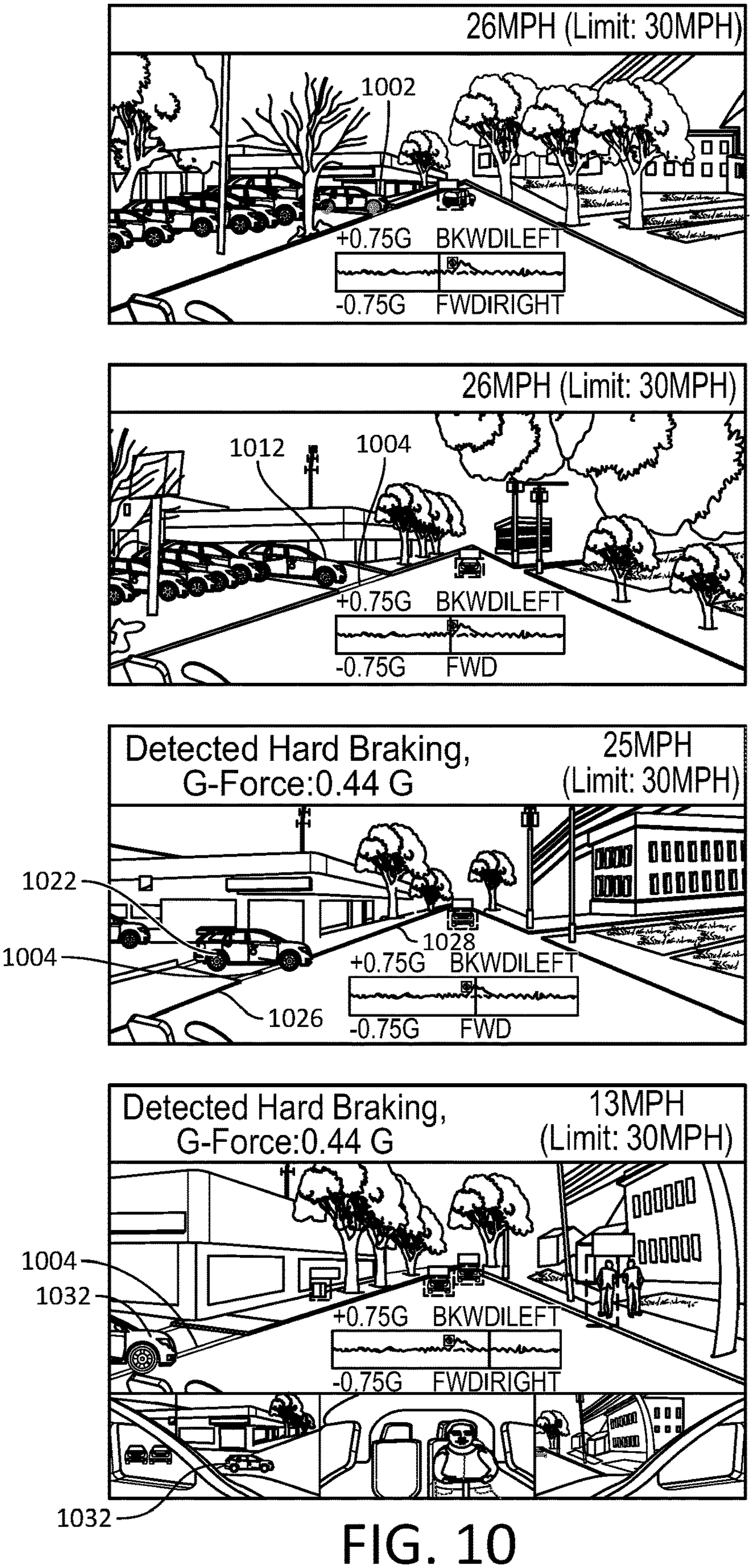
FIG. 10 illustrates an example in which a driver triggered a Hard Braking alert at a time in which it appeared that another vehicle was about to turn left so that it would merge into the driver's path of travel.

In some embodiments of certain aspects of the present disclosure, a combination alert may refer to the co-occurrence of a first event that was detected and a second event that was avoided, where the second event appeared likely to occur, but did not. Two examples of combination alerts in which one of the events of the combination was actually avoided are illustrated in FIGS. 9 and 10. For these examples, the combination driving event may be considered a driving event combined with a predicted event. Alternatively, the combination driving event may be considered an detected driving event combined with a precursor event, where the precursor event is typically associated with another event.

The driving event illustrated in FIG. 9 corresponds to a Hard Braking alert that was triggered by the monitored driver at a time corresponding to the fourth illustrated frame (top frame of the right column). As can be seen in the earlier frames, the monitored vehicle was travelling in a lane in which traffic was moving faster than was traffic in the adjacent right lane. In the third frame, when the monitored vehicle was nearing the rear of a truck 902 that was transporting passenger vehicles, a turn indictor 904 became illuminated. In the fourth frame, the front of the truck can be seen about to cross the lane boundary separating it from the monitored vehicle. A moment later, as illustrated in the fifth frame, the other truck straightened itself out again. Finally, in the sixth frame, it can be observed that the monitored vehicle safely passed the truck. In this example, the illumination of the turn signal 904, the angling of the front of the truck in the fourth frame, or a combination thereof, may be considered a precursor event. In this example, these precursor events are typically associated with a lane change by another vehicle. In this instance, however, the lane change did not actually occur.

A system enabled with certain aspects of the present disclosure may determine that the Hard Braking event occurred at approximately the same time that a lane change by the third party vehicle would be predicted to occur. Accordingly, even with no additional observations, a system enabled with certain aspects of the present disclosure may determine that the observed hard braking maneuver in combination with one or more precursor events and/or a predicted behavior of another vehicle or object, mitigated a heightened risk of a collision. Such combination alerts may be flagged for further review, or in some embodiments, may be automatically determined to be a positive driving event, which may have a positive impact on a driver's aggregate score.

FIG. 10 illustrates an example in which a monitored driver is travelling in an urban area on a main road. The monitored driver approaches and then passes another road at a T-intersection, where the other road, but not the main road, is governed by a stop sign 1026. In the first frame, a car 1002 may be seen on the crossroad ahead and to the left. In the second frame, the same car 1012 may be seen, at this time closer to an inner boundary of a crosswalk 1004 (where the boundary of the crosswalk that is closer to the interior of the intersection may be referred to as the inner boundary of the crosswalk).

In the third frame, the car 1026 has now crossed the inner boundary of the crosswalk 1024, so that the nose of the car 1026 is actually in the intersection. In this example, the inner boundary of the crosswalk 1024, is approximately colinear with the left curb 1026 of the main road before the intersection and the left curb 1028 of the main road after the intersection. In this example, therefore, the inner boundary of the crosswalk is placed at approximately the same location the threshold between the other road and the intersection with the main road.

The monitored driver in this example began to apply his brakes between the times associated with the second and third frames. While the monitored driver did not come to a complete stop, the car 1032 can be seen at the fourth time in both the forward view and the left side view, indicating that the car 1032 did come to a complete stop (rather than run through the stop sign) and there was no collision.

According to certain aspects, hard braking events such as the ones illustrated in FIGS. 9 and 10 may be used to train a machine learning model to predict times and locations associated with an elevated risk that another vehicle will 'unexpectedly' drive into a monitored vehicle's path of travel. By presenting such events to a neural network capable of processing sequences of images, sequences of object detections, and the like, the network may learn to recognize patterns of movements that would cause an alert human driver to quickly apply his or her brakes. In the example illustrated in FIG. 10, the crossing of the threshold of the intersection, or the crossing of the crosswalk, etc., may be recognized as a precursor event that predicts that a third-party driver is likely to enter an intersection. In some embodiments, such a pattern may also be used as a heuristic. When a hard-braking event occurs at a time that is proximate to an observed trajectory of another vehicle beyond a typical stop-sign stopping location, then the hard-braking event may be automatically considered to be responsive to the other vehicle. In such a case, the hard-braking event may be excused (converted to neutral) or may be recognized as a risk-mitigating and proactive driving behavior (converted to DriverStar). Alternatively, or in addition, a threshold for triggering a reportable event may be increased. In an ADAS case, the threshold for a warning may be lessened and made more sensitive. In any case, the additional factor or factors may combine with the Hard Braking event so that it is treated in a non-negative manner.

Figure 11:
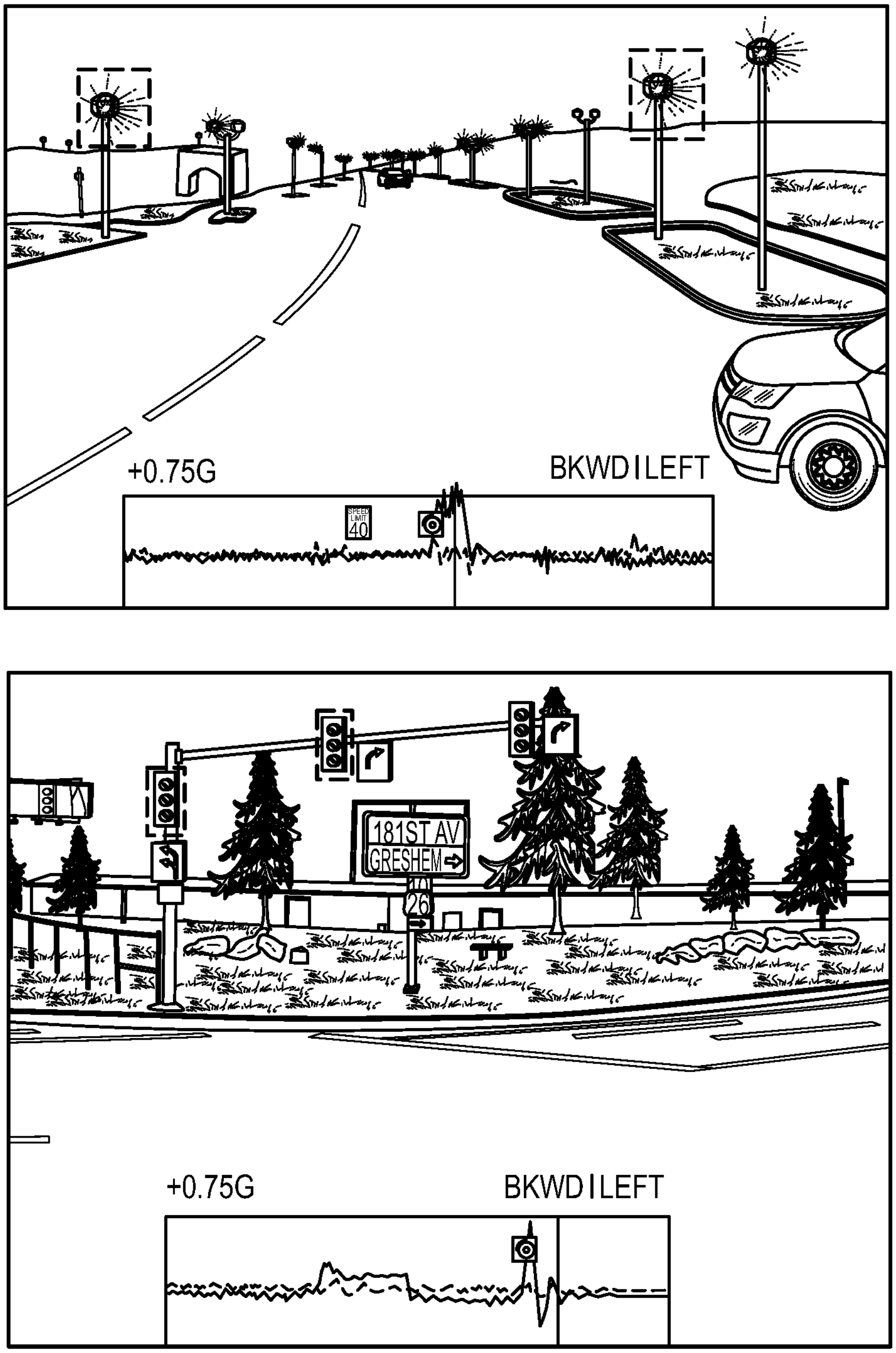
FIG. 11 illustrates examples of a Hard Braking alert combined with a detection of a green traffic light in accordance with certain aspects of the present disclosure.

FIG. 11 illustrates three separate examples in which a Hard Braking event was detected at an intersection and in the presence of a traffic light that applies to the monitored driver, when the traffic light was illuminated green. Because a green traffic light is meant to instruct the driver to drive forward, a hard-braking maneuver in this context may be presumed to be responsive to another risk in the environment. In the first example, a car may be seen crossing through the intersection perpendicular to the monitored driver despite the green light for the monitored driver (which implies a red light for cross traffic). In the second example, the cross traffic that caused the driver to trigger a hard brake was not detectable until about 10 seconds after the hard-braking event. In this example, the driver may have made a judgment that it would be preferable to wait a few moments to ensure that a fast approaching truck on the crossroad would be able to stop in time before the intersection.

As illustrated by the examples in FIG. 11, a Hard Braking event combined with a detection of a traffic light that is illuminated green may be considered a combination event that is presumptively neutral in the context of an IDMS. For example, while a fleet would not want to encourage drivers to slam on their brakes on a green light unnecessarily, the fleet as a policy may give drivers a benefit of the doubt when it occurs. Furthermore, when there is an additional detection, such as another vehicle crossing the monitored drivers path a short time later, the hard braking event may become presumptively positive. A positive event may, for example, be more likely to be selected for recognition, may be used as a teaching tool for other drivers, and/or may positively affect a driver's summary safety score.

According to certain aspects, a combination alert may correspond to a recognizable error mode of a feature of an IDMS. The examples illustrated in FIG. 12 correspond to common error modes associated with a "Hard Braking caused by Stop Sign" alert, which itself is a combination of a detection of a Hard Braking maneuver and a detection of a stop sign. This combination event may be presumptively negative, as it may tend to correspond to a driver's inattentiveness, where the Hard Braking corresponds to the driver noticing at a late time that there is a stop sign governing the intersection. In the cases illustrated in FIG. 12, however, there is another detectable factor which may overcome the presumption of inattention. In the example illustrated at the top, the Hard Braking event is followed by a long stopping period. In addition, the stop occurs about 40 yards before the stop sign. Finally, the boulders visible in the scene indicate that this is a rest area. Any of these additional factors, alone, or in combination, may be a basis for determining that this Hard Braking caused by Stop Sign alert should be presumptively neutral. In this particular example, the Hard Braking was due to the driver coming to a normal complete stop in a rest area.

Figure 12:
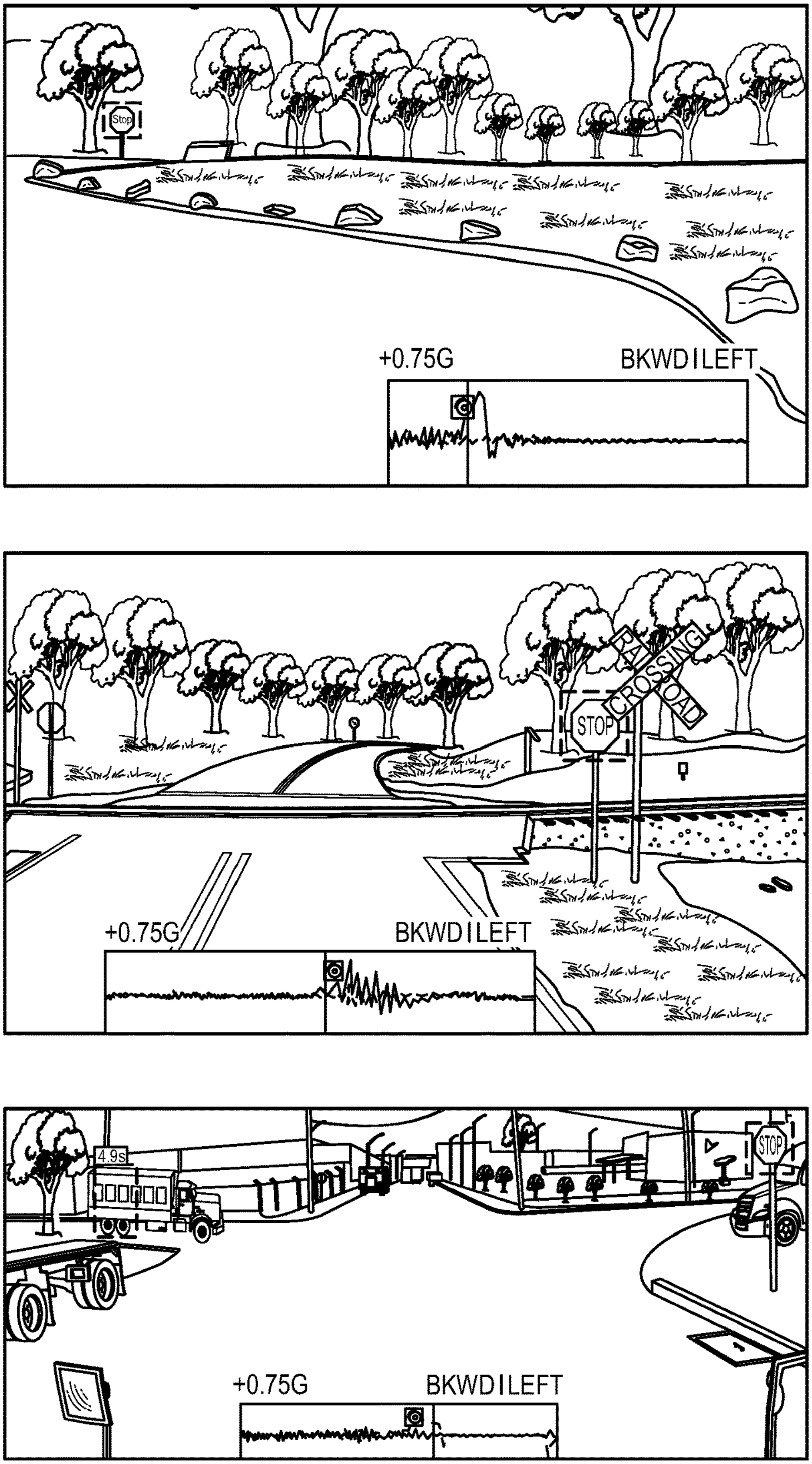
FIG. 12 illustrates an example of a Hard Braking alert combined with a detection of a stop sign, and further combined with another detection, in accordance with certain aspects of the present disclosure.

In the middle example illustrated in FIG. 12, a Hard Braking alert was triggered at a Stop sign that is positioned by a railroad crossing. In this example, the reference Hard Braking alert was erroneous. Rather than Hard Braking, the extreme values observed on the inertial sensor were caused by the truck driving over the railroad tracks. Because travelling over railroad tracks may be a common error mode of false detection of other inertial events, such as hard braking, a hard braking event may be automatically ignored in this situation and/or reclassified as a railroad crossing event.

In the bottom example illustrated in FIG. 12, the driver triggers a hard brake about 10 yards before a stop sign. After coming to a complete stop, the truck seen on the left side of the image makes a wide right turn on to the road on which the monitored driver is driving. In this case, the location of the hard braking event, well in advance of the customary stopping location, or the subsequent trajectory of the other truck, or both, may combine to convert the "Hard Braking due to Stop Sign" alert to be presumptively positive. In this case, the driver exhibited courteous and efficient driving by giving the other driver plenty of space to execute a turn.

Map-Based Trigger of an Analytics Routine

Certain aspects of the present disclosure generally relate to embedded data inference, and more particularly, to systems and methods of selectively performing data inference at an embedded device based on map information and the location of the device.

For embedded data inference applications, which may include machine vision for advanced driving assistance systems (ADAS), intelligent driver monitoring systems (IDMS), and the like, a computational device may be coupled to a vehicle and may perform data inferences based on sensor data collected by the vehicle. The computational demands of embedded data inference applications may often exceed the available computational resources of the embedded device. For example, demand on computational resources by image processing algorithms may be prohibitive for some devices. Given the utility of machine vision in ADAS and IDMS applications, however, the present disclosure seeks to address this problem. Accordingly, aspects of the present disclosure are directed to systems and methods that may enable embedded devices to locally execute computationally demanding data inference applications, such as vision-based inference applications.

Some driver monitoring systems may detect driving events based on non-visual sensors, but may further include a vision sensor to capture visual data around the time of a detected event. In one example, a driver monitoring system may process inertial sensor data to detect undesired driving behaviors. An inertial event may be an event with a detectable signature on a trace of accelerometer or gyrometer data, such as a transient spike in an accelerometer trace corresponding to a sudden stop by a vehicle. As commercial-grade inertial sensors may be noisy, however, such a system may falsely detect irrelevant inertial events (which may be referred to as "false alarms") that have a similar accelerometer trace but that may not correspond to a driving event of interest. For example, running over a pothole or a speed bump may have an accelerometer reading that is similar to that of a small collision.

To mitigate against false alarms, an inertial sensor-based system may record a video clip upon detecting an inertial event, and then the video clip may be reviewed by a human operator at a later time. Due to the involvement of the human operator, such as system may be expensive and cumbersome. In addition, while the video clip may be useful to correct false alarms, an inertial-triggered driver monitoring system may fail to notice a driving event that does not have a reliably detectable inertial signature. For example, an inertial-based system with a camera may fail to detect a driver running through a red light if the driver neither accelerated or decelerated through the red light.

While a designer of an TOT device may desire continuous video recording and storage to provide greater coverage, practical considerations may frustrate the utility of such a system. For example, continuously recorded video may be burdensome to store, expensive and time-consuming to transmit over cellular or other wireless networks, and/or impractical to review by human operators.

For embedded driver monitoring systems, it may be desirable for the embedded device to be small, low power, and low cost, and yet produce data inferences that are fast, accurate, and reliable. Current IDMS, autonomous driving, and mapping applications may have more analytics routines to run that can be processed locally in a desired time window and/or at a desired cost. Likewise, such systems may collect more data than can be reasonably stored or transmitted. While processing, memory storage, and data transmission capabilities continue to improve, the amount of data collected, the sophistication of data analytics routines, and the desire for faster and more accurate inference continues to increase as a well. As a result, processing, memory storage, and data transmission constraints are and will continue to be limiting factors in the progress of IDMS, autonomous driving, mapping applications, and the like.

For some applications, the processing capacity of an embedded device may be so inadequate relative to the demands of vision-based data inference, that the device may not execute vision-based data inference as all. In one example, existing IDMS devices that purports to incorporate video data may actually limit on-device data inference routines to processing relatively low-bandwidth inertial sensor data and may passively record concurrently captured video data. In these systems, if the inertial-based inference routine detects a salient event, such as a hard turn, the system may transmit a corresponding portion of the video data to a cloud server and may leave the data inference for a human reviewer at a later time. This approach limits the utility of an IDMS in several ways. First, because the embedded device is only able to detect driving events that have an inertial signature, many kinds of salient driving events may be missed. For example, a driver may run a red light at a constant velocity. Because the driver maintained a constant velocity, there may be no discernible inertial signature associated with the event of crossing the intersection on a red light. Using visual data inference, however, may enable detection of a traffic sign, and may be a basis of detecting the driving event. The approach of limiting embedded data inference to low-bandwidth data streams, therefore, may limit the utility of an IDMS as they may be blind to certain salient traffic events that may not have a reliably discernible inertial signature.

Vision-Based Event Detection

Certain aspects of the present disclosure may enable the use of visual data in TOT systems and devices, such as driver behavior monitoring systems. Visual data may improve existing ways or enable new ways of monitoring and characterizing driver behavior. In some embodiments, visual data captured at a camera affixed to a vehicle may be used as the basis for detecting a driving event. For example, a driver monitoring system enabled in accordance with certain aspects of the present disclosure may detect that a driver has run a red light, even if the event could not be reliably detected from inertial sensor data and/or GPS data.

Several means for determining an event from visual data are contemplated. To determine that a driver has run a red light, for example, a first device may be configured to analyze visual data to detect an object. An object detection may refer to producing bounding boxes and object identifiers that correspond to one or more relevant objects in a scene. In a driver monitoring system, for example, it may be desirable to produce bounding boxes surrounding all or most of the visible cars, as well as visible traffic lights, traffic signs, and the like. Continuing with the example of running a red light, a first device may be configured to detect (locate and identify) a traffic light in visual data across multiple frames, including frames in which only a portion of a traffic light may be visible in the field of view of a camera. The event of running a red-light may then be based on a location of the detected traffic light and its state (such as green or red) at different points in time, such as before and after the vehicle entered the intersection.

Several means for detecting an event based on visual data are contemplated. In some embodiments, bounding boxes for objects may be produced by a neural network that has been trained to detect and classify objects that are relevant to driving, such as traffic lights, traffic signs, vehicles, lane boundaries, road boundaries, and intersection markings. In some embodiments, vehicles may be assigned to one or more of multiple classes, such as a car class and a truck class. If an image contains two cars and a traffic light, for example, a trained neural network may be used to analyze the image and produce a list of three sets of five numbers. Each set of numbers may correspond to one of the objects (one set for each of the two cars, and a third set for the traffic light). For each set, four of the five numbers may indicate the coordinates of the detected object (for example, the horizontal and vertical coordinates of a top-left corner of a bounding box surrounding the object, and a height and a width of the bounding box), and one number indicating the class to which it belonged (for example, the cars may be identified with a "1" and the traffic light may be identified with a "3"). Alternatively, the network may produce a probability that the detected object belongs in one or more classes of objects. Several systems and methods of detecting and classifying traffic events are described in U.S. patent Ser. No. 10/460,400, titled, "DRIVING BEHAVIOR MONITORING", filed 21 Feb. 2017, referenced supra.

Embedded Data Inference on a Low Complexity Processor Using Maps

Embedded data inference in accordance with certain aspects of the present disclosure may include processing data that is collected on a device that is embedded within a machine. Based on an inference from the data, the machine may take some action. If the device is embedded in a semi-autonomous vehicle, for example, an action based on an inference may be a command to alter the direction of motion of the semi-autonomous vehicle. The action need not involve physical movements of the machine, however. In accordance with certain aspects of the present disclosure, the action may be a command to communicate data stored on the machine and/or subsequently captured to a second device.

The computational processing capability of edge-computing (i.e. embedded) devices may be a limiting constraint for some applications. Continuing with the example of a semi-autonomous vehicle, an edge device may be configured to execute a control loop to guide its movements based on sensor inputs. Furthermore, the control loop may incorporate data inference on visual data using multi-layer neural network models. The compute capabilities the embedded device running the application, however, may not be adequate to process the camera sensor data as fast as it may be captured. Accordingly, the camera data may be processed at a lower resolution than it is captured, may be processed at a lower frame rate than it is captured, or both. In comparison to a device that could perform data inference on visual data at a higher frame rate and image resolution, the system may not perceive environmental objects until they are closer. This example illustrates how the computational capacity of an embedded computing device may limit the speed at which a semi-autonomous vehicle could safely travel.

Embedded data inference may include computer vision processing. Computer vision processing may include models that are used to perform inferences by converting camera and other sensor data to class labels, location bounding boxes, pixel labels, or other inferred values. Models may be trained, may contain engineered feature detectors, or both.

Aspects of the present disclosure are directed to performing embedded data inference. In some applications, aspects of the present disclosure may enable embedded devices to perform computer vision processing and other computationally demanding data processing routines. Certain aspects of the present disclosure provide systems and methods to automatically determine which analytics routines to run, and/or which data to store and/or transmit. Accordingly, certain challenges relating to limited processing, memory storage, and data transmission capabilities of embedded devices may be overcome by focusing the available computing resources to salient times and places.

Map and/or time data may be used to determine whether an inference should be performed, whether an inference should be performed at a high or low resolution, and a high or low frame rate, and the like. In some locations, the use of positional data to gate inference processing may reduce a number of false alarms. For example, in locations known to have high false alarm rates, the avoidance of vision-based processing may result in the avoidance of a false detection.

Legacy, inertial-based IDMS may have unacceptably high false alarm rates, in some cases owing to a lack of on-board visual processing. One strategy for suppressing false alarms includes filtering out event detections based on positional data. For example, a driving maneuver detection module that may process inertial sensor data to detect that a driver performed an illegal U-turn, when the driver was actually making an allowed U-turn in a warehouse parking lot. Because the U-turn is permissible, the U-turn "detection" would be a false alarm. The desired outcome may therefore be accomplished by suppressing all U-turn detection that are detected in the same or similar locations. This approach may yield acceptable performance in situations for which the event may be detected based on a low-complexity inference engine. An inference engine configured to detect U-turns based on inertial data may be considered an example of such a low-complexity inference engine.

In contrast to the approach just reviewed, certain aspects of the present disclosure are directed to utilizing positional information to mitigate the processing demands of a computationally intensive data inference, such as vision-based inferences, before they occur. In some embodiments of certain aspects of the present disclosure, positional information may be utilized before, rather than after, data inference is performed. Rather than (or in addition to) using positional information to determine which event detections should be suppressed, a device enabled with certain aspects of the present disclosure may use positional information to avoid or reduce data inference computations. By focusing the available computing resources to salient times and places, vision-based inference may be enabled on an edge-computing device. Accordingly, certain challenges relating to limited processing, memory storage, and data transmission capabilities of embedded devices may be overcome.

Continuing with the example of a U-turn, at certain locations, a system enabled with certain aspects of the present disclosure may not execute certain components or all of a data inference engine that may be employed to detect a U-turn. Accordingly, subsequent processing steps, such as determining whether to alert a remote system about the driving maneuver, may be likewise avoided.

For a simple driving maneuver like a U-turn, the savings in processing time associated with detecting the maneuver may not represent a significant portion of the computational budget of an edge-computing device. For vision-based inference, however, which may involve a substantially higher computational budget, an ability to avoid the execution of certain components of an inference engine may be an enabling factor. For example, certain aspects of the present disclosure may enable vision-based inference for an IDMS that would otherwise only be capable of inferences based on relatively low data rate GPS and inertial sensor streams.

By first determining that vision based data inference should not be performed, embodiments of certain aspects of the present disclosure may free up enough computational resources so that vision based inference may be utilized at other certain times and locations. An enabled system may thereby overcome many of the limitations of data inference systems that are limited to processing lower data rate signals, and/or for which conservation of power consumption may influence processing priorities.

Map-Based Selective Inference

According to certain aspects of the present disclosure, spatial and/or temporal maps may be utilized to improve the capabilities of edge-computing inference systems, which may improve IDMS, autonomous driving, and mapping devices, systems, and methods. Map-based selective inference may include the selective performance of all on-device inference routines (including inertial and vision-based inference routines), such that the device may be effectively powered down, or may operate in a low power state when the inference routines need not be run.

In another example, map-based selective inference may refer to selective performance of vision-based inference. In this example, the device may continue to process lower-complexity inference routines on a substantially continuous basis during operation of the vehicle. In another example, in accordance with certain aspects, map-based inference may refer to selective processing of specified portions of available inference routines. For example, lane detection inference may be run during normal highway operation, but intersection-related inference processing may be avoided.

Additional examples of map-based selective inference are contemplated, including a system configured to search for a stop sign at locations known to have a stop sign, and otherwise not execute the stop-sign search logic. In this example, stop-sign search logic may entail high-resolution inference of portions of the image, tracking, using color images for inference vs. black and white, using a higher complexity vision model, and the like. In another example, an inertial-based inference engine may be triggered at known locations of a stop sign. Even without visual inference, a map-based trigger may analyze stop-sign behavior based on position of vehicle and inertial data, at least in a coarse manner. Alternatively, or in addition, a system may selectively process image data associated with the time that the driver came to a complete stop in the vicinity of a known stop sign, which may include a time that precedes coming to a complete stop. Based on inferences computed on this image or images, an IDMS may be enabled to determine with improved certainty whether the driver came to a complete stop prior to a crosswalk or after already entering the intersection.

In another example, a parking analytics inference engine may be selectively performed in relevant areas and/or at relevant times. For example, an inference routine that may be adapted to detect which parking spaces are available may be selectively applied to visual data when the vehicle is in a congested area for which information relating to parking availability may be more useful to the driver or other drivers in the same network or subject to a data sharing agreement. Further, a parking availability routine may be selectively performed at times of day for which available parking spaces are known to be sparse. Accordingly, embedded devices may collectively perform computationally demanding vision tasks, but do so in a selective manner so that the overall impact to the power consumption and/or computational queue(s) of any one edge device may be consistent with a desired power and/or computational budget.

A time-based inference trigger may be considered a form of map-based trigger, wherein the map providing the impetus for the inference trigger contains temporal information. For example, the map may organize spatial information by time of day, day of week, and/or may keep track of holidays to the extent that such information may be utilized to further improve devices, systems, and methods disclosed herein. In one example, the opening hours of nearby business may affect the desirability of searching for parking spaces. In accordance with certain aspects, the crowd-sourced system may learn that the utility of searching for empty parking spaces in a parking lot near an amusement park decreases quickly after the amusement park closes, even though the parking lot may still be substantially full.

Map-Based Memory Storage

As discussed above, certain aspects of the present disclosure are directed to utilizing map data to selectively process sensor data on an edge-computing device. Similarly, certain aspects of the present disclosure may be directed to selectively storing sensor data on a local memory of an edge-computing device.

According to certain aspects, a system, device or method may record visual data at certain locations. In another example, a system, device, or method may store visual data at a high resolution and frame rate at certain locations. Likewise, the transmission of visual data to the cloud may vary based on the location from which the visual data were captured.

Another contemplated example includes selective or preferential recording of visual data at locations having a known high probability of traffic infractions. Likewise, a system, device, or method may record visual data at times of day that are associated with high probability of accidents. The memory space may be effectively made available by ignoring visual data captured on open roads. Memory storage techniques may be applied to data that is stored locally or remotely.

Lane-Level Map Triggers

In certain embodiments, inference routines may be selectively run based on a determined lane position in conjunction with map information. In one contemplated example, a lane-level positioning system may determine that the driver is in the third lane from the right road boundary. With reference to the map and coarse positional information of the vehicle (for example, from a GPS), it may be determined that the driver in in a left-turn lane. Based on this inference, one or more analytics routines may be triggered. In this situation, a system may cause the processing of inference routines that include detecting, tracking, and classifying a left turn arrow, interpreting road signage, including no-left turn signs, detecting and tracking on-coming traffic and determining time-to-collision. During a left turn, the system may run inference that may determine the occupancy of the road in a perpendicular lane.

While all or some of the just mentioned inference routines may be run while the driver is preparing to turn left, the same routines may be skipped (e.g. tracking and classifying a left turn lane) or run at a lower frequency (determining time-to-collision of on-coming traffic) at other times. In this case, the map-based trigger would draw more heavily on the processing power of the inference engine to assist the driver in a left turn lane, to assist the autonomous control system in completing a left-turn, for more accurate driving monitoring, and the like.

IDMS Based on Behavioral Maps

In a first stage, certain aspects of the present disclosure provide systems and methods that improve or enable intelligent edge-computing inference devices. For example, driving behaviors can be assessed or ignored based on map data in reference to pre-determined definitions of safe/unsafe, compliant/non-compliant driving behaviors, and the like. At a second stage, crowd sourced data may be used to construct behavioral maps. For example, maps may be constructed indicated which stop signs are routinely ignored and which stop signs are typically observed. Based on map data concerning driving behaviors associated with different locations, an inference system may adjust its definitions of certain driving behaviors.

In some embodiments, severity ratings of a rolling stop violation may be based in part on behavioral map data. Based on map data, which may include behavioral map data, an edge-computing inference device may adjust its frame rate of visual resolution processing. In locations associated with high frequency of salient driving events, the frame rate of processing and/or resolution may be increased. In locations associated with a low frequency of salient driving events, a high probability of false alarms, and the like, the processing frame rate may be decreased. Contemplated examples include increased processing during rush hour and/or traveling on a road facing into the sun, the frame rate may be increased to better assist a driver given the higher likelihood of a traffic incident. While driving on an open-road, however, the system may conserve resources by processing images at 1 frame per second, for example, or may power-down for intermittently. The system may therefore run using less power, and/or may utilize the freed bandwidth to re-process previously observed data at a higher frame rate/resolution, construct map data based on previous observations, or perform system maintenance operations.

In accordance with certain aspects, an IDMS may selectively or preferentially process behavioral driving sensor streams and locations and or times where a behavioral map indicates that there is a relatively high probability of a traffic event. For example, based on an underlying likelihood of a traffic incident, based on a behavioral map, an IDMS may be selectively powered on during a percentage of a driving trip for which it is most likely that the driver will perform or be subjected to a positive or negative driving event. The percentage of power-on time may depend on the remaining charge in the device battery, may depend on a desired visibility threshold, and the like. In one example, the system may occasionally power on at a time having a low-probability of an event, which may over time help to avoid selection biases.

Behavioral maps may enable a form of behavioral crowd sourcing. In one example, if the map indicates that a high percentage of drivers travel at 75 mph along a certain stretch of road, the system may infer that driving at that speed in considered safe at that location. Similarly, if the map indicates that compliant driving behavior is nearly always observed in a given location, the system may selectively power-down in that location, because the likelihood of detecting a correctable driving violation is low. On the other end of the safety spectrum, if a relatively large portion of driver commit a driving violation in a particular location, the IDMS may increase the probability of being powered on when the driver approaches that location.

In some embodiments, rather than providing an indication that a specific traffic event is more common at a particular location, the behavioral map may provide a generic indication that the location is unsafe. For example, a stretch of road may be associated with an increased frequency of traffic violations, although a diverse variety of traffic violations.

Vision Processing Triggered by Other Inference Outputs

Additional contemplated embodiments include inference engine triggers in which a lower-complexity inference routine may trigger a higher-complexity inference routine. A detected hard-braking event on the lower-complexity inference routine, for example, may trigger processing of a vision-based inference engine. Similarly, a coarse estimate of a driving behavior, such as a signal from a separate lane departure warning system, may trigger additional vision-based processing.

In some embodiments, a trigger for processing on one camera input stream may be based on the processing of a second camera input stream. For example, based on a determination that the driver is following a second vehicle at an unsafe distance, or that the driver is drifting out of his lane, both of which may be determined based on processing of forward-facing camera, processing of an inward camera data stream may be triggered. In this way, analysis of a driver's attentive state may be limited to times for which the likelihood of distraction may be higher average.

Landmark Verification and Updates

Another contemplated use of certain aspects of the present disclosure may be directed to the selectively running vision-based inference at a high frame rate and/or resolution in the presence of a landmark. A landmark may be considered to be a static object that may be reliably detected and may therefore be useful for vison-based positioning. Preferential application of computational resources could more quickly improve the accuracy of a crowd-sourced landmark navigation system, may more quickly modify the landmark positions when there are changes, and the like. An accurate map of landmarks may provide for vision-based positioning in locations having a known poor GPS signal, such as in urban canyons, or during periods of high atmospheric interference.

In accordance with certain aspects, landmark maps in the vicinity of construction zones may be more frequently updated on average than other locations. Similarly, landmark updates may occur more frequently, or with greater processing power for sites that are relatively unvisited.

In some embodiments, map data combined with coarse positional data may enable the edge device to selectively process a subset of the image data being captured. For example, if a landmark is expected to appear on the right side of the forward-facing camera's field of view, the system may selectively process image pixels from the right side of the image. In this way, the system may increase the frame rate and/or resolution at which it processes that portion of the image in comparison to a routine for which the entire image is processed.

According to certain aspects, a method comprises receiving an image from a camera coupled to a vehicle, determining a position of the vehicle, and determining whether to process the image based on the position of the vehicle. The method may further comprise determining a likelihood of a driving behavior at the position. In some embodiments, the driving behavior is a complete stop, rolling stop, or failure to stop and the position is associated with a traffic sign or traffic light. In some such embodiments, the traffic sign is a stop sign.

In some embodiments, the association of the position with the traffic sign or traffic light is based on previous processing of a previously received image or images at or near the position. In some embodiments, the association of the position with the traffic sign or traffic light is based on previous processing of previously received inertial sensor data at or near the position. In some embodiments, the association of the position with the traffic sign or traffic light is based on a map of one or more traffic signs or traffic lights.

In some embodiments, the vehicle in traveling on a first road, and the traffic sign or traffic light is associated with a second road, and optionally, processing the image is avoided based on the position. In such embodiment, the position is associated with a high likelihood of traffic light or traffic sign compliance infraction false alarms.

In some embodiments of the aforementioned method, the likelihood of a driving behavior is determined based on previously processed images received at or near the position. The method may further comprise constructing a map of the likelihood of a driving behavior at a plurality of positions and querying the map with the determined position of the vehicle; wherein determining whether to process the image is based on a result of the query. In some embodiments, the method may further comprise processing the image at a device coupled to the vehicle based on the determination of whether to process the image.

According to certain aspects, a method comprises receiving an image from a camera coupled to a vehicle, determining a position of the vehicle, determining a stability of a map at the position, and determining whether to process the image based on the stability. The method may further comprise processing the image to produce an observation data; and updating the map based on the observation data. The method may further comprise processing the image to produce an observation data, comparing the observation data and a map data to produce a change data, and updating the map data based the change data. In such embodiments, the method may further comprise determining a degree of change based on the change data and updating the stability of the map at the position based on the degree of change.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein may be downloaded and/or otherwise obtained by a user terminal and/or base station as applicable. For example, such a device may be coupled to a server to facilitate the transfer of means for performing the methods described herein. Alternatively, various methods described herein may be provided via storage means (e.g., RAM, ROM, a physical storage medium such as a thumb drive, etc.), such that a user terminal and/or base station may obtain the various methods upon coupling or providing the storage means to the device. Moreover, any other suitable technique for providing the methods and techniques described herein to a device may be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method, comprising:

receiving, by a computer, sensor data of a vehicle and/or visual data of an environment outside the vehicle;

detecting, by the computer in the vehicle, a combination driving event, wherein detecting the combination driving event comprises:

detecting, by the computer, from the sensor data and/or visual data that a first driving event occurred at a first time;

detecting, by the computer, from the sensor data and/or visual data that a second driving event occurred at a second time, wherein the second time is within a predetermined time interval of the first time; wherein the first driving event belongs to a first class of driving events, and wherein the second driving event belongs to a second class of driving events;

recognizing, by the computer, an appropriate braking response to a detected hazard based on the detected first driving event and second driving event; and modifying, by the computer and in response to the detection of the combination driving event, a valance parameter affecting a report to a remote device, wherein the report comprises an indication that the second driving event was detected at the second time, wherein the valence parameter is modified to be positive and corresponds to positive feedback for the combination driving event, and wherein the valence parameter affects a data transmission likelihood; and determining, based on a modified value of the data transmission likelihood parameter, whether to transmit the sensor data and/or visual data of the second driving event to the remote device based on the modified value of the data transmission likelihood parameter satisfying a threshold value.

2. The method of claim 1, wherein the sensor data and/or visual data comprises video data of the second driving event.

3. The method of claim 2, wherein the modified value of the data transmission likelihood parameter is higher than a value of a predetermined data transmission likelihood of driving events belonging to the second class of driving events.

4. The method of claim 2, wherein the modified value of the data transmission likelihood parameter is lower than a value of a predetermined data transmission likelihood of driving events belonging to the second class of driving events.

5. The method of claim 4, wherein, based on the modified value of the data transmission likelihood parameter, transmission, by the computer and to the remote device, of the sensor data and/or visual data corresponding the second driving event is suppressed.

6. The method of claim 2, wherein the data transmission likelihood parameter is modified from an initial value to the modified value based on the detection of the combination event, and wherein the initial value is a predetermined throttling parameter corresponding to the second class of driving events.

7. The method of claim 2, wherein the data transmission likelihood parameter is modified by selecting a first throttling parameter from a plurality of throttling parameters, the first throttling parameter corresponding to a class of combination driving events to which the combination driving event belongs, and wherein the plurality further comprises a second throttling parameter corresponding to the second class of driving events.

8. The method of claim 1, wherein the second class of driving events is a hard-braking event class; and wherein the method further comprises:

determining, by the computer, that a driver of the vehicle engaged in a risk mitigating maneuver based on the detection of the second driving event.

9. The method of claim 8, wherein detecting that the first driving event occurred comprises:

determining that the vehicle is travelling on a road and approaching an intersection with a second road;

receiving, by the computer, the visual data from a road-facing camera on the vehicle;

detecting, by the computer and based on the visual data, an intersection stop line corresponding to a second road;

detecting, by the computer, a second vehicle travelling on the second road; and determining, by the computer, that the second vehicle failed to come to a complete stop before the intersection stop line based on the visual data.

10. The method of claim 1, wherein the valence parameter affects at least one of:

a summary driving score for the driver; or a likelihood that data corresponding to the combination driving event will be incorporated into:

a positive recognition report for the driver.

11. The method of claim 1, wherein the valence parameter affects a likelihood that data corresponding to the combination driving event will be incorporated into a training set comprising video of risk mitigating human driving actions.

12. The method of claim 1, further comprising:

transmitting, by the computer, the report to the remote device, wherein the report further comprises an indication of the detected combination driving event; and determining, at the remote device, whether to request corresponding the sensor data and/or visual data from the computer in the vehicle, based at least in part on the report.

13. The method of claim 1, further comprising:

receiving, by the computer, the visual data from a camera on the vehicle, wherein the visual data comprises video data of the second driving event.

14. The method of claim 13, wherein a first duration of transmitted videos for driving events of the first class is characterized by a first context interval, a second typical duration of transmitted videos for driving events of the second class is characterized by a second context interval, and wherein the method further comprises:

determining a duration of the video data based on the first time, the second time, the first context interval and the second context interval.

15. The method of claim 14, wherein the duration of the video data comprises a union of the first context interval and the second context interval, and further comprises any gap between the first context interval and the second context interval.

16. The method of claim 14, wherein the duration of the video data comprises an interval when the first context interval and the second context interval overlap.

17. The method of claim 1, wherein detecting the first driving event comprises:

determining, by the computer, a position of the vehicle; and determining, by the computer and based on the position, that the vehicle has entered a location where the sensor data and/or visual data corresponding to the combination driving event should be processed.

18. The method of claim 17, further comprising:

querying, by the computer and based on the position of the vehicle, a map of positions at which driving events of the second class tend to occur; and determining, by the computer and based on the query, a likelihood that the second driving behavior will be observed within the predetermined time interval, wherein the determination that the sensor data and/or visual data should be processed is based on the likelihood that the second driving behavior will be observed.

19. The method of claim 17, wherein detecting the second driving event comprises:

receiving, by the computer, the visual data from a camera on the vehicle; and processing, by the computer, the visual data to detect the second driving event.

20. The method of claim 17, wherein the position is associated with a traffic sign or a traffic light.

21. The method of claim 1, wherein the first driving event comprises the vehicle approaching an intersection, and further comprising:

determining if the second time corresponds to a time after the vehicle has already crossed through the intersection; and suppressing the detection of the combination alert in response to determining that the vehicle had already crossed through the intersection by the second time.

22. The method of claim 1, wherein the first driving event comprises the vehicle approaching a second vehicle; and wherein detecting that the second driving event occurred at the second time comprises:

modifying, by the computer, an event criterion of the second driving event in response to the detection of the first driving event.

23. The method of claim 22, wherein the second driving event comprises a driver of the vehicle looking away from a direction of travel of the vehicle, wherein the event criterion is a duration over which the driver looks away from the direction of travel, and wherein the modified criterion is a modified duration that is shorter than the duration.

24. The method of claim 23, wherein the duration is 5 seconds, and wherein the modified duration is 3 seconds.

25. The method of claim 1, further comprising: generating, by the computer, audio feedback in response to the detection of the combination driving event.

26. A system comprising:

at least one memory unit; and at least one processor coupled to the at least one memory unit, in which the at least one processor is configured to:

receive sensor data of a vehicle and/or visual data of an environment outside the vehicle;

detect from the sensor data and/or visual data that a first driving event occurred at a first time, wherein the first driving event belongs to a first class of driving events;

detect from the sensor data and/or visual data that a second driving event occurred at a second time, wherein the second driving event belongs to a second class of driving events;

detect a combination driving event, based on a determination that the second time is within a predetermined time interval of the first time; and modify, in response to the detection of the combination driving event, a valence parameter affecting a report to a remote device, wherein the report comprises an indication that the second driving event was detected at the second time, wherein the valence parameter is modified to be positive and corresponds to positive feedback for the combination driving event, and wherein the valence parameter affects a data transmission likelihood;

recognize an appropriate braking response to a detected hazard based on the detected first driving event and second driving event; and determine, based on a modified value of the data transmission likelihood parameter, whether to transmit the sensor data and/or visual data of the second driving event to the remote device based on the modified value of the data transmission likelihood parameter satisfying a threshold value.

27. A computer program product, the computer program product comprising:

a non-transitory computer-readable medium having program code recorded thereon, the program code, when executed by a processor, causes the processor to:

receive sensor data of a vehicle and/or visual data of an environment outside the vehicle;

detect from the sensor data and/or visual data that a first driving event occurred at a first time, wherein the first driving event belongs to a first class of driving events;

detect from the sensor data and/or visual data that a second driving event occurred at a second time, wherein the second driving event belongs to a second class of driving events;

detect a combination driving event, based on a determination that the second time is within a predetermined time interval of the first time; and modify, in response to the detection of the combination driving event, a valence parameter affecting a report to a remote device, wherein the report comprises an indication that the second driving event was detected at the second time, wherein the valence parameter is modified to be positive and corresponds to positive feedback for the combination driving event, and wherein the valence parameter affects a data transmission likelihood;

recognize an appropriate braking response to a detected hazard based on the detected first driving event and second driving event; and determine, based on a modified value of the data transmission likelihood parameter, whether to transmit the sensor data and/or visual data of the second driving event to the remote device based on the modified value of the data transmission likelihood parameter satisfying a threshold value.

* * * * *